(12) United States Patent
Hensley et al.

(10) Patent No.: US 9,637,915 B1
(45) Date of Patent: *May 2, 2017

(54) FACTORY FABRICATED PRECOMPRESSED WATER AND/OR FIRE RESISTANT EXPANSION JOINT SYSTEM TRANSITION

(71) Applicant: EMSEAL JOINT SYSTEMS LTD., Westborough, MA (US)

(72) Inventors: Lester Hensley, Westborough, MA (US); Bill Witherspoon, Guelph (CA)

(73) Assignee: Emseal Joint Systems Ltd., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,327

(22) Filed: Dec. 31, 2012

Related U.S. Application Data

(63) Continuation-in-part of application No. 12/635,062, filed on Dec. 10, 2009, and a continuation-in-part of application No. 13/729,500, filed on Dec. 28, 2012, which is a continuation-in-part of application No. 12/622,574, filed on Nov. 20, 2009, now Pat. No. 8,365,495.

(60) Provisional application No. 61/121,590, filed on Dec. 11, 2008, provisional application No. 61/116,453, filed on Nov. 20, 2008.

(51) Int. Cl.
*E04B 1/68* (2006.01)
*E01C 11/02* (2006.01)
*E04B 1/94* (2006.01)

(52) U.S. Cl.
CPC ............ *E04B 1/948* (2013.01); *E04B 1/6812* (2013.01)

(58) Field of Classification Search
CPC .............................. E04B 1/6812; E04B 1/948
USPC .......... 52/393, 396.04, 396.07, 586.1, 586.2, 52/741.4; 404/47, 68
See application file for complete search history.

(56) References Cited

U.S. PATENT DOCUMENTS

| | | |
|---|---|---|
| 517,701 A | 4/1894 | Knower |
| 945,914 A | 4/1909 | Colwell |
| 1,357,713 A | 11/1920 | Lane |
| 1,371,727 A | 3/1921 | Blickle |

(Continued)

FOREIGN PATENT DOCUMENTS

| | | |
|---|---|---|
| CA | 1280007 | 4/1989 |
| CA | 1334268 | 8/1989 |

(Continued)

OTHER PUBLICATIONS

Kohlmeyer, DE 102005054375 Al, date pulled Sep. 25, 2013, p. 1-4.*

(Continued)

*Primary Examiner* — Elizabeth A Quast
(74) *Attorney, Agent, or Firm* — MKG LLC

(57) ABSTRACT

A fire and/or water resistant expansion joint system for installation into a building joint in vertical and horizontal configurations is designed such that it can be used for either an inside or outside corner. The system comprises a core having a fire retardant infused therein. A layer of an elastomer is disposed on the core and is tooled to define a profile to facilitate the compression of the expansion joint system when installed between coplanar substrates. The system can be delivered to a job site in a pre-compressed state ready for installation into the building joint.

40 Claims, 11 Drawing Sheets

(56) References Cited

U.S. PATENT DOCUMENTS

| | | |
|---|---|---|
| 1,428,881 A | 9/1922 | Dyar |
| 1,691,402 A | 11/1928 | Oden |
| 1,716,994 A | 6/1929 | Wehrle |
| 1,809,613 A | 6/1931 | Walker |
| 2,010,569 A | 8/1935 | Sitzler |
| 2,016,858 A | 10/1935 | Hall |
| 2,035,476 A | 3/1936 | Herwood |
| 2,152,189 A | 4/1936 | Henderson |
| 2,069,899 A | 2/1937 | Older |
| 2,190,532 A | 2/1940 | Lukomski |
| 2,240,787 A | 5/1941 | Kinzer |
| 2,271,180 A | 1/1942 | Brugger |
| 2,277,286 A | 3/1942 | Bechtner |
| 2,544,532 A | 3/1951 | Hill |
| 2,701,155 A | 2/1955 | Estel, Jr. |
| 2,776,865 A | 1/1957 | Anderson |
| 2,828,235 A | 3/1958 | Holland et al. |
| 2,954,592 A | 10/1960 | Parsons |
| 2,995,056 A | 10/1960 | Knox |
| 3,024,504 A | 3/1962 | Miller |
| 3,080,540 A | 3/1963 | McFarland |
| 3,111,069 A | 11/1963 | Farbish |
| 3,124,047 A | 3/1964 | Graham |
| 3,172,237 A | 3/1965 | Bradley |
| 3,194,846 A | 7/1965 | Blaga |
| 3,232,786 A | 2/1966 | Kellman |
| 3,244,130 A | 4/1966 | Hippie, Jr. |
| 3,245,328 A | 4/1966 | Fassbinder |
| 3,255,680 A | 6/1966 | Cooper et al. |
| 3,262,894 A | 7/1966 | Green |
| 3,289,374 A | 12/1966 | Metz |
| 3,298,653 A | 1/1967 | Omholt |
| 3,300,913 A | 1/1967 | Patry et al. |
| 3,302,690 A | 2/1967 | Hurd |
| 3,335,647 A | 8/1967 | Thorp, Jr. |
| 3,344,011 A | 9/1967 | Goozner |
| 3,352,217 A | 11/1967 | Peters et al. |
| 3,355,846 A | 12/1967 | Tillson |
| 3,363,383 A | 1/1968 | Barge |
| 3,371,456 A | 3/1968 | Balzer et al. |
| 3,372,521 A | 3/1968 | Thom |
| 3,378,958 A | 4/1968 | Parks et al. |
| 3,394,639 A | 7/1968 | Viehmann |
| 3,410,037 A | 11/1968 | Empson et al. |
| 3,435,574 A | 4/1969 | Hallock |
| 3,447,430 A | 6/1969 | Gausepohl |
| 3,470,662 A | 10/1969 | Kellman |
| 3,482,492 A | 12/1969 | Bowman |
| 3,543,459 A | 12/1970 | Mills |
| 3,551,009 A * | 12/1970 | Bruce et al. ............ 285/226 |
| 3,575,372 A | 4/1971 | Emberson |
| 3,582,095 A | 6/1971 | Bogaert et al. |
| 3,603,048 A | 9/1971 | Hadfield et al. |
| 3,604,322 A | 9/1971 | Koster |
| 3,606,826 A | 9/1971 | Bowman |
| 3,629,986 A | 12/1971 | Klittich |
| 3,643,388 A | 2/1972 | Parr et al. |
| 3,659,390 A | 5/1972 | Balzer et al. |
| 3,670,470 A | 6/1972 | Thom |
| 3,672,707 A * | 6/1972 | Russo et al. ............ 285/229 |
| 3,677,145 A | 7/1972 | Wattiez |
| 3,694,976 A | 10/1972 | Warshaw |
| 3,712,188 A | 1/1973 | Worson |
| 3,720,142 A | 3/1973 | Pare |
| 3,736,713 A | 6/1973 | Flachbarth et al. |
| 3,742,669 A | 7/1973 | Mansfeld |
| 3,745,726 A | 7/1973 | Thom |
| 3,750,359 A | 8/1973 | Balzer et al. |
| 3,760,544 A | 9/1973 | Hawes et al. |
| 3,797,188 A | 3/1974 | Mansfeld |
| 3,849,958 A | 11/1974 | Balzer et al. |
| 3,856,839 A | 12/1974 | Smith et al. |
| 3,871,787 A | 3/1975 | Stegmeier |
| 3,880,539 A | 4/1975 | Brown |
| 3,883,475 A | 5/1975 | Racky et al. |
| 3,896,511 A | 7/1975 | Cuschera |
| 3,907,443 A | 9/1975 | McLean |
| 3,911,635 A | 10/1975 | Traupe |
| 3,934,905 A * | 1/1976 | Lockard ............ 285/229 |
| 3,944,704 A | 3/1976 | Dirks |
| 3,951,562 A | 4/1976 | Fyfe |
| 3,956,557 A | 5/1976 | Hurst |
| 3,974,609 A | 8/1976 | Attaway |
| 4,007,994 A | 2/1977 | Brown |
| 4,018,017 A | 4/1977 | Schoop |
| 4,018,539 A | 4/1977 | Puccio |
| 4,022,538 A | 5/1977 | Watson et al. |
| 4,030,156 A | 6/1977 | Raymond |
| 4,055,925 A | 11/1977 | Wasserman et al. |
| 4,058,947 A | 11/1977 | Earle et al. |
| 4,066,578 A | 1/1978 | Murch et al. |
| 4,129,967 A | 12/1978 | Barlow |
| 4,132,491 A | 1/1979 | Scheffel |
| 4,134,875 A | 1/1979 | Tapia |
| 4,140,419 A | 2/1979 | Puccio |
| 4,143,088 A | 3/1979 | Favre et al. |
| 4,146,939 A | 4/1979 | Izzi |
| 4,174,420 A | 11/1979 | Anolick et al. |
| 4,181,711 A | 1/1980 | Ohashi et al. |
| 4,204,856 A | 5/1980 | Yigdall et al. |
| 4,221,502 A | 9/1980 | Tanikawa |
| 4,224,374 A | 9/1980 | Priest |
| 4,237,182 A | 12/1980 | Fulmer et al. |
| 4,245,925 A | 1/1981 | Pyle |
| 4,246,313 A | 1/1981 | Stengle, Jr. |
| 4,258,606 A | 3/1981 | Wilson |
| 4,270,318 A | 6/1981 | Carroll et al. |
| 4,271,650 A | 6/1981 | Lynn-Jones |
| 4,288,559 A | 9/1981 | Illger et al. |
| 4,290,249 A | 9/1981 | Mass |
| 4,290,713 A | 9/1981 | Brown et al. |
| 4,295,311 A | 10/1981 | Dahlberg |
| 4,305,680 A | 12/1981 | Rauchfuss, Jr. |
| 4,320,611 A | 3/1982 | Freeman |
| 4,359,847 A | 11/1982 | Schukolinski |
| 4,362,428 A | 12/1982 | Kerschner |
| 4,367,976 A | 1/1983 | Bowman |
| 4,374,207 A | 2/1983 | Stone et al. |
| 4,374,442 A | 2/1983 | Hein et al. |
| 4,401,716 A | 8/1983 | Tschudin-Mahrer |
| 4,424,956 A | 1/1984 | Grant et al. |
| 4,431,691 A | 2/1984 | Greenlee |
| 4,432,465 A | 2/1984 | Wuertz |
| 4,433,732 A | 2/1984 | Licht et al. |
| 4,447,172 A | 5/1984 | Galbreath |
| 4,453,360 A | 6/1984 | Barenberg |
| 4,455,396 A * | 6/1984 | Al-Tabaqchall et al. ....... 521/54 |
| 4,473,015 A | 9/1984 | Hounsel |
| 4,486,994 A | 12/1984 | Fisher et al. |
| 4,494,762 A | 1/1985 | Geipel |
| 4,533,278 A | 8/1985 | Corsover et al. |
| 4,558,875 A | 12/1985 | Yamaji et al. |
| 4,564,550 A | 1/1986 | Tschudin-Mahrer |
| 4,566,242 A | 1/1986 | Dunsworth |
| 4,576,841 A | 3/1986 | Lingemann |
| 4,589,242 A | 5/1986 | Moulinie et al. |
| 4,615,411 A | 10/1986 | Breitscheidel et al. |
| 4,620,330 A | 11/1986 | Izzi, Sr. |
| 4,620,407 A | 11/1986 | Schmid |
| 4,622,251 A | 11/1986 | Gibb |
| 4,637,085 A | 1/1987 | Hartkorn |
| 4,687,829 A | 8/1987 | Chaffee et al. |
| 4,693,652 A | 9/1987 | Sweeney |
| 4,711,928 A | 12/1987 | Lee et al. |
| 4,717,050 A | 1/1988 | Wright |
| 4,745,711 A | 5/1988 | Box |
| 4,751,024 A | 6/1988 | Shu et al. |
| 4,756,945 A | 7/1988 | Gibb |
| 4,767,655 A | 8/1988 | Tschudin-Mahrer |
| 4,773,791 A | 9/1988 | Hartkorn |
| 4,780,571 A | 10/1988 | Huang |
| 4,781,003 A * | 11/1988 | Rizza ............ 52/396.07 |
| 4,784,516 A | 11/1988 | Cox |
| 4,791,773 A | 12/1988 | Taylor |

(56) References Cited

U.S. PATENT DOCUMENTS

| | | | |
|---|---|---|---|
| 4,807,843 A | 2/1989 | Courtois et al. |
| 4,815,247 A | 3/1989 | Nicholas |
| 4,824,283 A | 4/1989 | Belangie |
| 4,835,130 A | 5/1989 | Box |
| 4,839,223 A | 6/1989 | Tschudin-Mahrer |
| 4,848,044 A | 7/1989 | LaRoche et al. |
| 4,849,223 A | 7/1989 | Pratt et al. |
| 4,866,898 A | 9/1989 | LaRoche et al. |
| 4,879,771 A | 11/1989 | Piskula |
| 4,882,890 A | 11/1989 | Rizza |
| 4,885,885 A | 12/1989 | Gottschling |
| 4,893,448 A | 1/1990 | McCormick |
| 4,901,488 A | 2/1990 | Murota et al. |
| 4,911,585 A | 3/1990 | Vidal et al. |
| 4,916,878 A | 4/1990 | Nicholas |
| 4,920,725 A | 5/1990 | Gore |
| 4,927,291 A | 5/1990 | Belangie |
| 4,932,183 A | 6/1990 | Coulston |
| 4,942,710 A | 7/1990 | Rumsey |
| 4,952,615 A | 8/1990 | Welna |
| 4,957,798 A * | 9/1990 | Bogdany ............... 428/95 |
| 4,965,976 A | 10/1990 | Riddle et al. |
| 4,977,018 A | 12/1990 | Irrgeher et al. |
| 4,992,481 A | 2/1991 | von Bonin et al. |
| 5,007,765 A | 4/1991 | Dietlein et al. |
| 5,013,377 A | 5/1991 | Lafond |
| 5,024,554 A | 6/1991 | Benneyworth et al. |
| 5,026,609 A | 6/1991 | Jacob et al. |
| 5,035,097 A | 7/1991 | Cornwall |
| 5,053,442 A | 10/1991 | Chu et al. |
| 5,060,439 A | 10/1991 | Clements et al. |
| 5,071,282 A | 12/1991 | Brown |
| 5,072,557 A | 12/1991 | Naka et al. |
| 5,082,394 A | 1/1992 | George |
| 5,094,057 A | 3/1992 | Morris |
| 5,115,603 A | 5/1992 | Blair |
| 5,120,584 A | 6/1992 | Ohlenforst et al. |
| 5,121,579 A | 6/1992 | Hamar et al. |
| 5,129,754 A | 7/1992 | Brower |
| 5,130,176 A * | 7/1992 | Baerveldt ............. 428/192 |
| 5,137,937 A | 8/1992 | Huggard et al. |
| 5,140,797 A | 8/1992 | Gohike et al. |
| 5,168,683 A | 12/1992 | Sansom et al. |
| 5,173,515 A | 12/1992 | von Bonin et al. |
| 5,190,395 A | 3/1993 | Cathey et al. |
| 5,209,034 A | 5/1993 | Box et al. |
| 5,213,441 A * | 5/1993 | Baerveldt ............. 404/66 |
| 5,222,339 A | 6/1993 | Hendrickson et al. |
| 5,249,404 A | 10/1993 | Leek et al. |
| 5,270,091 A | 12/1993 | Krysiak et al. |
| 5,297,372 A | 3/1994 | Nicholas |
| 5,327,693 A * | 7/1994 | Schmid ............. 52/396.02 |
| 5,335,466 A | 8/1994 | Langohr |
| 5,338,130 A | 8/1994 | Baerveldt |
| 5,354,072 A | 10/1994 | Nicholson |
| 5,365,713 A | 11/1994 | Nicholas et al. |
| 5,367,850 A | 11/1994 | Nicholas |
| 5,380,116 A | 1/1995 | Colonias |
| 5,436,040 A | 7/1995 | Lafond |
| 5,441,779 A | 8/1995 | Lafond |
| 5,443,871 A | 8/1995 | Lafond |
| 5,450,806 A * | 9/1995 | Jean ............. 114/74 A |
| 5,456,050 A | 10/1995 | Ward |
| 5,472,558 A | 12/1995 | Lafond |
| 5,479,745 A | 1/1996 | Kawai et al. |
| 5,485,710 A | 1/1996 | Lafond |
| 5,489,164 A | 2/1996 | Tusch et al. |
| 5,491,953 A | 2/1996 | Lafond |
| 5,498,451 A | 3/1996 | Lafond |
| 5,501,045 A | 3/1996 | Wexler |
| 5,508,321 A * | 4/1996 | Brebner ............. 523/179 |
| 5,528,867 A | 6/1996 | Thompson |
| RE35,291 E | 7/1996 | Lafond |
| 5,572,920 A | 11/1996 | Kennedy et al. |
| 5,607,253 A | 3/1997 | Almstrom |
| 5,611,181 A | 3/1997 | Shreiner et al. |
| 5,616,415 A | 4/1997 | Lafond |
| 5,628,857 A | 5/1997 | Baerveldt |
| 5,635,019 A | 6/1997 | Lafond |
| 5,649,784 A | 7/1997 | Ricaud et al. |
| 5,650,029 A | 7/1997 | Lafond |
| 5,656,358 A | 8/1997 | Lafond |
| 5,658,645 A | 8/1997 | Lafond |
| 5,664,906 A | 9/1997 | Baker et al. |
| 5,680,738 A | 10/1997 | Allen et al. |
| 5,686,174 A | 11/1997 | Irrgeher |
| 5,691,045 A | 11/1997 | Lafond |
| 5,744,199 A | 4/1998 | Joffre et al. |
| 5,759,665 A | 6/1998 | Lafond |
| 5,762,738 A | 6/1998 | Lafond |
| 5,765,332 A | 6/1998 | Landin et al. |
| 5,773,135 A | 6/1998 | Lafond |
| 5,791,111 A | 8/1998 | Beenders |
| 5,806,272 A | 9/1998 | Lafond |
| 5,813,191 A | 9/1998 | Gallagher |
| 5,830,319 A | 11/1998 | Landin |
| 5,851,609 A | 12/1998 | Baratuci et al. |
| 5,875,598 A | 3/1999 | Batten et al. |
| 5,876,554 A | 3/1999 | Lafond |
| 5,878,448 A | 3/1999 | Molter |
| 5,887,400 A | 3/1999 | Bratek et al. |
| 5,888,341 A | 3/1999 | Lafond |
| 5,935,695 A * | 8/1999 | Baerveldt ............. 428/218 |
| 5,957,619 A | 9/1999 | Kinsohita et al. |
| 5,974,750 A | 11/1999 | Landin |
| 5,975,181 A | 11/1999 | Lafond |
| 6,001,453 A | 12/1999 | Lafond |
| 6,014,848 A | 1/2000 | Hilburn, Jr. |
| 6,035,536 A | 3/2000 | Dewberry |
| 6,035,587 A | 3/2000 | Dressler |
| 6,035,602 A | 3/2000 | Lafond |
| 6,039,503 A | 3/2000 | Cathey |
| 6,041,848 A | 3/2000 | Langner |
| D422,884 S | 4/2000 | Lafond |
| 6,088,972 A | 7/2000 | Johanneck |
| 6,102,407 A | 8/2000 | Moriya et al. |
| 6,115,980 A | 9/2000 | Knak et al. |
| 6,115,989 A | 9/2000 | Boone et al. |
| 6,128,874 A | 10/2000 | Olson et al. |
| 6,131,352 A | 10/2000 | Barnes et al. |
| 6,131,364 A | 10/2000 | Peterson |
| 6,131,368 A | 10/2000 | Tramposch et al. |
| 6,138,427 A | 10/2000 | Houghton |
| 6,148,890 A | 11/2000 | Lafond |
| 6,158,915 A | 12/2000 | Kise |
| 6,189,573 B1 | 2/2001 | Ziehm |
| 6,192,652 B1 | 2/2001 | Goer et al. |
| 6,207,085 B1 | 3/2001 | Ackerman |
| 6,207,089 B1 | 3/2001 | Chuang |
| 6,219,982 B1 | 4/2001 | Eyring |
| 6,237,303 B1 | 5/2001 | Allen et al. |
| 6,250,358 B1 | 6/2001 | Lafond |
| 6,253,514 B1 | 7/2001 | Jobe et al. |
| 6,329,030 B1 | 12/2001 | Lafond |
| 6,350,373 B1 | 2/2002 | Sondrup |
| 6,351,923 B1 | 3/2002 | Peterson |
| 6,355,328 B1 | 3/2002 | Baratuci et al. |
| 6,368,670 B1 | 4/2002 | Frost et al. |
| 6,419,237 B1 | 7/2002 | More |
| 6,439,817 B1 | 8/2002 | Reed |
| 6,443,495 B1 | 9/2002 | Harmeling |
| 6,460,214 B1 | 10/2002 | Chang |
| 6,491,468 B1 * | 12/2002 | Hagen ............. 403/291 |
| 6,499,265 B2 | 12/2002 | Shreiner |
| 6,532,708 B1 * | 3/2003 | Baerveldt ............. 52/396.05 |
| 6,544,445 B1 | 4/2003 | Graf et al. |
| 6,552,098 B1 | 4/2003 | Bosch et al. |
| 6,574,930 B2 | 6/2003 | Kiser |
| 6,581,341 B1 | 6/2003 | Baratuci et al. |
| 6,598,364 B1 | 7/2003 | Pelles |
| 6,665,995 B2 | 12/2003 | Deane |
| 6,666,618 B1 | 12/2003 | Anaya et al. |
| 6,685,196 B1 | 2/2004 | Baerveldt |
| 6,820,382 B1 | 11/2004 | Chambers et al. |

(56) References Cited

U.S. PATENT DOCUMENTS

| | | |
|---|---|---|
| 6,860,074 B2 | 3/2005 | Stanchfield |
| 6,862,863 B2 | 3/2005 | McCorkle et al. |
| 6,877,292 B2 | 4/2005 | Baratuci et al. |
| 6,897,169 B2 | 5/2005 | Matsui et al. |
| 6,905,650 B2 | 6/2005 | McIntosh et al. |
| 6,948,287 B2 | 9/2005 | Korn |
| 6,989,188 B2 | 1/2006 | Brunnhofer et al. |
| 6,996,944 B2 | 2/2006 | Shaw |
| 7,043,880 B2 | 5/2006 | Morgan et al. |
| 7,070,653 B2 | 7/2006 | Frost et al. |
| 7,090,224 B2 | 8/2006 | Iguchi et al. |
| 7,101,614 B2 | 9/2006 | Anton et al. |
| 7,114,899 B2 | 10/2006 | Gass et al. |
| 7,210,557 B2 | 5/2007 | Phillips et al. |
| 7,222,460 B2 | 5/2007 | Francies, III et al. |
| 7,225,824 B2 | 6/2007 | West et al. |
| 7,240,905 B1 | 7/2007 | Stahl, Sr. |
| 7,278,450 B1 | 10/2007 | Condon |
| 7,287,738 B2 | 10/2007 | Pitlor |
| 7,441,375 B2 | 10/2008 | Lang |
| 7,621,731 B2 | 11/2009 | Armantrout et al. |
| 7,665,272 B2 | 2/2010 | Reen |
| 7,678,453 B2 | 3/2010 | Ohnstad et al. |
| 7,748,310 B2 | 7/2010 | Kennedy |
| 7,757,450 B2 | 7/2010 | Reyes et al. |
| 7,836,659 B1 | 11/2010 | Barnes |
| 7,856,781 B2 | 12/2010 | Hilburn, Jr. |
| 7,877,958 B2 | 2/2011 | Baratuci et al. |
| 7,941,981 B2 | 5/2011 | Shaw |
| 8,033,073 B1 | 10/2011 | Binder |
| 8,079,190 B2 | 12/2011 | Hilburn, Jr. |
| 8,171,590 B2 | 5/2012 | Kim |
| 8,172,938 B2 | 5/2012 | Alright et al. |
| 8,317,444 B1 | 11/2012 | Hensley |
| 8,333,532 B2 | 12/2012 | Derrigan et al. |
| 8,341,908 B1* | 1/2013 | Hensley et al. ........... 52/396.01 |
| 8,365,495 B1* | 2/2013 | Witherspoon ............... 52/741.3 |
| 8,397,453 B2 | 3/2013 | Shaw |
| 8,601,760 B2 | 12/2013 | Hilburn, Jr. |
| 8,720,138 B2 | 5/2014 | Hilburn, Jr. |
| 8,739,495 B1* | 6/2014 | Witherspoon ............... 52/741.3 |
| 8,813,449 B1 | 8/2014 | Hensley et al. |
| 8,813,450 B1 | 8/2014 | Hensley et al. |
| 9,068,297 B2 | 6/2015 | Hensley et al. |
| 9,200,437 B1 | 12/2015 | Hensley et al. |
| 2002/0052425 A1 | 5/2002 | Kaku et al. |
| 2002/0088192 A1 | 7/2002 | Calixto |
| 2002/0095908 A1 | 7/2002 | Kiser |
| 2002/0113143 A1 | 8/2002 | Frost et al. |
| 2002/0193552 A1 | 12/2002 | Kiuchi et al. |
| 2003/0005657 A1 | 1/2003 | Visser et al. |
| 2003/0110723 A1* | 6/2003 | Baerveldt .................. 52/396.04 |
| 2003/0213211 A1 | 11/2003 | Morgan et al. |
| 2004/0020162 A1 | 2/2004 | Baratuci et al. |
| 2004/0045234 A1 | 3/2004 | Morgan et al. |
| 2004/0101672 A1 | 5/2004 | Anton et al. |
| 2004/0113390 A1 | 6/2004 | Broussard, III |
| 2005/0066600 A1 | 3/2005 | Moulton et al. |
| 2005/0120660 A1 | 6/2005 | Kim et al. |
| 2005/0155305 A1 | 7/2005 | Cosenza et al. |
| 2005/0193660 A1 | 9/2005 | Mead |
| 2005/0222285 A1 | 10/2005 | Massengill et al. |
| 2006/0010817 A1 | 1/2006 | Shull |
| 2006/0030227 A1* | 2/2006 | Hairston et al. ............... 442/136 |
| 2006/0117692 A1 | 6/2006 | Trout |
| 2006/0178064 A1 | 8/2006 | Balthes et al. |
| 2007/0059516 A1 | 3/2007 | Vincent et al. |
| 2007/0137135 A1 | 6/2007 | Shymkowich |
| 2007/0199267 A1 | 8/2007 | Moor |
| 2007/0261342 A1 | 11/2007 | Cummings |
| 2008/0172967 A1 | 7/2008 | Hilburn |
| 2008/0193738 A1* | 8/2008 | Hensley et al. ........... 428/308.4 |
| 2008/0268231 A1 | 10/2008 | Deib |
| 2009/0036561 A1 | 2/2009 | Nygren |
| 2009/0223150 A1 | 9/2009 | Baratuci et al. |
| 2009/0223159 A1 | 9/2009 | Colon |
| 2009/0246498 A1 | 10/2009 | Deiss |
| 2009/0315269 A1 | 12/2009 | Deiss |
| 2010/0058696 A1 | 3/2010 | Mills |
| 2010/0275539 A1 | 11/2010 | Shaw |
| 2010/0281807 A1 | 11/2010 | Bradford |
| 2010/0319287 A1 | 12/2010 | Shaw |
| 2011/0016808 A1 | 1/2011 | Hulburn, Jr. |
| 2011/0083383 A1 | 4/2011 | Hilburn, Jr. |
| 2011/0088342 A1 | 4/2011 | Stahl, Sr. et al. |
| 2011/0135387 A1 | 6/2011 | Derrigan et al. |
| 2011/0247281 A1 | 10/2011 | Pilz et al. |
| 2012/0117900 A1 | 5/2012 | Shaw |
| 2014/0151968 A1 | 6/2014 | Hensley et al. |
| 2014/0219719 A1 | 8/2014 | Hensley et al. |
| 2014/0360118 A1 | 12/2014 | Hensley et al. |

FOREIGN PATENT DOCUMENTS

| | | |
|---|---|---|
| CA | 1259351 | 9/1989 |
| CA | 1280007 | 2/1991 |
| CA | 2256660 A1 | 2/2000 |
| CA | 2296779 C | 11/2006 |
| CA | 2640007 A1 | 3/2009 |
| DE | 4436280 A1 | 4/1996 |
| DE | 19809973 C1 * | 7/1999 |
| DE | 102005054375 A1 | 5/2007 |
| DE | 102005054375 A1 * | 5/2007 |
| EP | 0976882 A2 | 2/1999 |
| EP | 0942107 A2 | 9/1999 |
| EP | 1118715 A1 | 7/2001 |
| EP | 1118726 A1 | 7/2001 |
| EP | 1540220 | 2/2004 |
| EP | 1540220 B1 | 8/2006 |
| EP | 1983119 A1 | 4/2007 |
| EP | 1983119 B1 | 10/2008 |
| GB | 977929 | 12/1964 |
| GB | 1359734 | 7/1974 |
| GB | 1495721 | 12/1977 |
| GB | 1519795 | 8/1978 |
| GB | 2181093 A | 4/1987 |
| GB | 2251623 A1 | 7/1992 |
| GB | 2359265 A | 8/2001 |
| GB | 2377379 A * | 1/2003 |
| JP | 200645950 A | 2/2006 |
| WO | 03006109 A1 | 1/2003 |
| WO | 2007023118 A2 | 3/2007 |
| WO | 2007024246 A1 | 3/2007 |

OTHER PUBLICATIONS

"Polyurethane Foam Field Joint Infill Systems", Sep. 23, 2007 (via Snagit), PIH, pp. 1-4.

EMSEAL Joint Systems Ltd. Drawing Part No. SJS-100-CHT-RN dated Nov. 20, 2007.

EMSEAL Joint Systems Ltd. Drawing Part No. 010-0-00-00 dated Dec. 6, 2005.

EMSEAL Material Safety Data Sheet dated Apr. 2002, pp. 1-2.

EMSEAL "Benchmarks of Performance for High-Movement Acrylic-Impregnated, Precompressed, Foam Sealants When Considering Substitutions"; http://www.emseal.com/Knowledge/AcrylicVsWax/AcrylicVsWaxBased.htm; printed on Jul. 3, 2012, pp. 1-4.

EMSEAL Colorseal & Seismic Colorseal Install Data, May 1997, pp. 1-2.

EMSEAL Colorseal Tech Data, Jan. 2000, pp. 1-2.

EMSEAL "Is There a Gap in Your Air Barrier Wall Design?: Overlooking joint sealing where it really matters—in the structural backup wall"; http://www.emseal.com/Knowledge/GapInAirBarrierDesign/GapInAirBarrierDesign.htm; printed on Jul. 19, 2012, pp. 1-2.

Manfredi, Liliana; et al. "Thermal degradation and fire resistance of unsaturated polyester, modified acrylic resins and their composites with natural fibres" Polymer Degradation and Stability 91; 2006; pp. 255-261.

(56) References Cited

OTHER PUBLICATIONS

EMSEAL "Pre-cured-Caulk-And-Backerblock" Not New, Not Equal to EMSEAL's Colorseal; http://www.emseal.com/Knowledge/PreCuredCaulk/COLORSEALvsPreCuredCaulk.htm; printed on Jul. 19, 2012, pp. 1-3.
Stein, Daryl et al. "Chlorinated Paraffins as Effective Low Cost Flame Retardants for Polyethylene" Dover Chemical Corporation.
Underwriters Laboratories Inc. Standard for Safety "Tests for Fire Resistance of Building Joint Systems", Jun. 30, 2008, UL2079.
Lester Hensley, "Where's the Beef in Joint Sealants? Hybrids Hold the Key," Applicator, vol. 23, No. 2, Spring 2001, pp. 1-5.
Emseal Joint Systems, Ltd, Seismic Colorseal, Tech Data, Apr. 1998, pp. 1-2.
Schul International Co., LLC, Sealtite VP Premium Quality Pre-compressed Joint Sealant for Weather tight, Vapor Permeable, Vertical Applications, Technical Data, dated Oct. 28, 2005, pp. 1-2.
ISO-Chemie GmbH, Product Data Sheet, ISO-FLAME Kombi F 120, pp. 1-2.
Schul International Co., LLC, Seismic Sealtite II, Colorized, Pre-compressed Joint Sealant for Vertical Applications, Technical Data, dated Sep. 20, 2006, pp. 1-2.
Dow Corning Corporation, Dow Corning 790 Silicone Building Sealant, copyright date 1995, 1999, pp. 1-6.
Emseal Joint Systems, Ltd, Horizontal Colorseal, Tech Data, Nov. 2008, pp. 1-2.
Emseal Joint Systems, Ltd, Seismic Colorseal, Tech Data, Jul. 2009, pp. 1-2.
Emseal Joint Systems, Ltd, Horizontal Colorseal, Tech Data, Jul. 2009, pp. 1-2.
Emseal Joint Systems, Ltd, Horizontal Colorseal, Tech Data, Jun. 2010, pp. 1-2.
Schul International Co., LLC, Sealtite "B", Pre-compressed Joint Sealant, Premium Quality for Secondary Sealant Applications, Technical Data, dated Oct. 28, 2005, pp. 1-2.
ISO-Chemie Gmbh, ISO-Flame Kombi F 120, pp. 1-2. German language.
ISO-Chemie GmbH, Order Confirmation Sheet, dated Apr. 26, 2007, pp. 1-3.
ISO-Flame Kombi F 120, Net Price List, Schul International Co., dated Jun. 27, 2006, pp. 1.
Tremco Illbruck Limited, Compriband Super FR, Fire Rated Acrylic Impregnated Foam Sealant Strip, Issue 3, dated Apr. 12, 2007, pp. 1-2.
Figure 1: The BS 476; Part 20 & EN 1363-1 time temperature curve, pp. 1.
Schul International Co., LLC, Sealtite, Premium Quality Pre-compressed Joint Sealant For Waterproof Vertical Applications, pp. 1.
Schul International Co., LLC, Sealtite 50N, Premium Quality Pre-compressed Joint Sealant For Horizontal Applications, dated Oct. 28, 2005, pp. 1-2.
Schul International Co., LLC, Sealtite "B", Pre-compressed Joint Sealant, Premium Quality for Secondary Sealant Applications, dated Oct. 28, 2005, pp. 1-2.
Schul International Co., LLC, Sealtite VP, Premium Quality Pre-compressed Joint Sealant For Weather tight, Vapor Permeable, Vertical Applications, dated Oct. 28, 2005, pp. 1-2.
Will-Seal, Signed, Sealed & Delivered, p. 1.
Illbruck/USA, Will-Seal 150 Impregnanted Precompressed Expanding Foam Sealant Tape, Spec-Data Sheet, Joint Sealers, dated Nov. 1987, pp. 1-2.
Illbruck, Inc., Will-Seal 250 Impregnanted Precompressed Expanding Foam Sealant Tape, Spec-Data Sheet, Joint Sealers, dated Aug. 1989, pp. 1-2.
U.S. Department of Labor, Material Safety Data Sheet, Identity: Willseal 150/250 and/or E.P.S., date prepared Jul. 21, 1986, pp. 1-2.
Illbruck, TechSpec Division Facade & Roofing Solutions, ALFAS compriband, Mar. 2005, pp. 1-10.
Salamander Industrial Products, Inc., blocoband HF—interior sealant, pp. 1.

Dow Corning Corporation, Dow Corning 790 Silicone Building Sealant, pp. 1-2.
Grace Fireproofing Products. Monokote Z-146T. 2007, pp. 1-2.
International Search Report and Written Opinion for PCT/US2014/032212, Aug. 25, 2014, pp. 1-13.
Polyurethane Foam Field Joint Infill Systems, Sep. 23, 2007 (via Snagit), PIH, pp. 1-5.
Grunau Illertissen Gmbh, Fir-A-Flex, Fire Protection for Linear Gaps in Walls and Ceilings, dated Aug. 1996, pp. 1-4.
UL Standard for Safety for Fire Resistance of Building Joint Systems, UL 2079, Underwriters Laboratories Inc. (UL); Fourth Edition; dated Oct. 21, 2004, pp. 1-38.
UL Standard for Safety for Fire Tests of Building Construction and Materials, UL 263, Underwriters Laboratories Inc. (UL); Thirteenth Edition; dated Apr. 4, 2003, pp. 1-40.
DIN 4102 Fire Behaviour of Building Materials and Building Components, Beuth Verlag GmbH; Sep. 2007, pp. 1-11.
ISO-Chemie GmbH, Iso-Bloco 600, pp. 1-2.
ISO-Chemie GmbH, PDS, ISO-FLAME, Kombi F 120, 2006, ENGLISH.
Merritt, Protection against Hazards, Section 3.30-3.31, 1994, pp. 1-4.
Schultz, Fire and Flammability Handbook, p. 363, 1985, pp. 1-3.
Netherlands Standards Institute, Fire resistance tests for non-loadbearing elements—Part 1: Walls, Aug. 1999, NEN-EN 1364-1, pp. 1-32.
Troitzsch, Jurgen, International plastics flammability handbook, 1983, pp. 1-2.
Polytite Manufacturing Company, Polytite "R" Colorized Joint Sealant, Jan. 7, 1998, pp. 1-2.
Saint-Gobain Performance Plastics, Norseal V740, labeled Copyright 2001, pp. 1-2.
Schul International Corporation, Hydrostop, Expansion Joint System, Jan. 17, 2001, pp. 1-2.
Schul International Co., LLC., Sealtite "B" Type II, Part of the S3 Sealant System, Jan. 5, 2006, pp. 1-2.
Schul International Co., LLC., Material Safety Data Sheet, Seismic Sealtite, Revised date Oct. 23, 2002, pp. 1-3.
Sealtite-Willseal, Installation Procedures for Seismic Sealtite/250C Joint Sealant, Mar. 4, 2001, p. 1.
UL Online Certifications Directory, XHBN.GuideInfo, Joint Systems, last updated Sep. 21, 2013, pp. 1-4.
Williams Products, Inc., Williams Everlastic 1715 Fire Classified Closures Tech Data, Oct. 2005, p. 1.
Emseal Joint Systems, Ltd., Emseal Colorseal Tech Data, Jul. 2009, p. 1-2.
Emseal Joint Systems, Ltd., Emseal Colorseal Tech Data, Mar. 2011, p. 1-2.
Emseal Joint Systems, Ltd., Emseal Horizontal Colorseal Tech Data, Aug. 2014, p. 1-2.
Emseal Joint Systems, Ltd., Emseal Seismic Colorseal Tech Data, Oct. 2009, pp. 1-2.
Emseal Joint Systems, Ltd., Emseal Seismic Colorseal Tech Data, Jun. 2010, pp. 1-2.
Emseal Joint Systems, Ltd., Emseal MST, Multi-Use Sealant Tape, Sep. 2008, pp. 1-2.
Emseal Joint Systems, Ltd., Emseal MST, Multi-Use Sealant Tape, Oct. 2013, pp. 1-2.
Emseal Joint Systems, Ltd., Emshield DFR2 System, Tech Data, Sep. 2014, pp. 1-4.
Emseal Joint Systems, Ltd., Emshield DFR2, last modified Sep. 19, 2014, pp. 1-4.
Emseal Joint Systems, Ltd., Emshield DFR3, last modified Sep. 4, 2014, pp. 1-5.
Emseal Joint Systems, Ltd., Emshield WFR2 and WFR3, last modified Sep. 3, 2014, pp. 1-5.
Emseal Joint Systems, Ltd., Colorseal-on-a-reel, last modified Nov. 10, 2014, pp. 1-3.
Emseal Joint Systems, Ltd., Colorseal, last modified Oct. 9, 2014, pp. 1-3.
Emseal Joint Systems, Ltd., QuietJoint, Tech Data, Nov. 2012, pp. 1-2.

(56) References Cited

OTHER PUBLICATIONS

Emseal Corporation Ltd., Material Safety Data Sheet, QuietJoint, MSDS Date May 13, 2014, pp. 1-2.
Emseal Joint Systems, Ltd., QuietJoint CAD Details, last modified Oct. 31, 2014, pp. 1-3.
http://www.emseal.com/products/architectural/QuietJoint/QuietJoint.htm, QuietJoint Mass-Loaded Acoustic Partition Closure, last modified Oct. 9, 2014, pp. 1-4.
http://www.emseal.com/products/architectural/QuietJoint/QuietJoint.htm, QuietJoint Mass-Loaded Acoustic Partition Closure, last modified Jul. 29, 2014, pp. 1-4.
http://www.emseal.com/products/architectural/QuietJoint/QuietJoint.htm, QuietJoint Mass-Loaded Acoustic Partition Closure, No intumescent coating, last modified Sep. 19, 2014, pp. 1-4.
Baerveldt, Konrad, The Applicator—Dear Tom: Emseal has two EIFS Expansion Joint Answers for you, Jun. 1991, pp. 1-4.
Report on the Filing or Determination of an Action Regarding a Patent or Trademark, Docket No. 1:14-cv 358-SM, Filed Aug. 13, 2014 regarding U.S. Pat. No. 8,739,495, 1 pg.
Report on the Filing or Determination of an Action Regarding a Patent or Trademark, Docket No. 14-cv-359-PB, Filed Aug. 13, 2014 regarding U.S. Pat. No. 8,739,495, 1 pg.
Defendants' Answer, Counterclaims, Affirmative Defenses, and Jury Demand, 1:14-cv-00359-PB, Doc. 11, Filed Oct. 3, 2014, 20 pages.
Defendants' Objection to Plaintiff's Partial Motion to Dismiss, 1:14-cv-00358-SM, Doc. 24, Filed Nov. 10, 2014, pp. 1-3.
Defendants' Objection to Plaintiff's Motion to Strike Defendants' Tenth Affirmative Defense, 1:14-cv-00358-SM, Doc. 25, Filed Nov. 12, 2014, pp. 1-3.
Defendants' Answer, Counterclaims, and Affirmative Defenses to Plaintiff's Consolidated Complaint, 1:14-cv-00358-SM, Doc. 38, Filed Dec. 9, 2014, pp. 1-48.
Defendants' Objection to Plaintiff's Partial Motion to Dismiss Count III of Defendants' Counterclaim, 1:14-cv-00358-SM, Doc. 50, Filed Jan. 16, 2015, pp. 1-15.
Defendants' Surreply to Plaintiff's Partial Motion to Dismiss Count II of Defendants' Counterclaims., 1:14-cv-00358-SM, Doc. 55, Filed Feb. 13, 2015, pp. 1-6.
Joint Claim Construction and Prehearing Statement, 1:14-cv-00358-SM, Doc. 56, Filed Mar. 3, 2015, pp. 1-9.
Lester Hensley, "Where's the Beef in Joint Sealants? Hybrids Hold the Key," AWCI's Construction Dimensions, Jan. 2006, 3 pgs.
IsoChemie, Iso-Bloco 600, Correspondence of Jun. 8, 2006, 13 pages.
Shul International Company, Invoice #18925 to P. J. Spillane, Sep. 14, 2007, 5 pages.
Illbruck Inc., Tested Physical Properties, 1994, 1 page.
Andrea Frangi, Zum Brandverhalten von Holzdecken aus Hohlkasten-elementen; Jun. 1999; 125 pages (English Translation).
Defendants' Joint First Amended Preliminary Invalidity Contentions received at MKG Mar. 17, 2015, 1:14-cv-00358-SM, 25 pgs. total.
Defendants' Joint First Amended Preliminary Invalidity Contentions received at MKG Mar. 17, 2015, Appendix A, 6 pgs.
Defendants' Joint First Amended Preliminary Invalidity Contentions received at MKG Mar. 17, 2015, Appendix B, 270 pgs.
Defendants' Joint First Amended Preliminary Invalidity Contentions received at MKG Mar. 17, 2015, Appendix B, 376 pgs.
Defendants' Joint First Amended Preliminary Invalidity Contentions received at MKG Mar. 17, 2015, Appendix C, 125 pgs.
Defendants' Joint First Amended Preliminary Invalidity Contentions received at MKG Mar. 17, 2015, Appendix D, 4 pgs.
IBMB, Test Report No. 3263/5362, Jul. 18, 2002, English Translation, 14 pgs.
IBMB, Test Report No. 3263/5362, Jul. 18, 2002, German, 13 pgs.
IBMB, Test Certificate No. 3002/2719, Mar. 22, 2000, English Translation, 14 pgs.
IBMB, Test Certificate No. P-3568/2560-MPA BS, Sep. 30, 2000, English Translation, 22 pgs.

IBMB, Test Certificate No. P-3568/2560-MPA BS, Sep. 30, 2000, German, 14 pgs.
IFT Rosenheim, Evidence of Performance Test Report 105 324691/e U, Apr. 19, 2006, 8 pgs.
Snapshot of Office Action issued in U.S. Appl. No. 90/013,428; printed in 2015, 14 pages.
Tremco Illbruck, Webbflex BI PU Foam, Fire Rated Expanding Polyurethane Foam, Sep. 11, 2006, pp. 1-2.
ASTM International, Designation: E 1966-01, Standard Test Method for Fire-Resistive Joint Systems. Current edition approved Oct. 10, 2001. Published Jan. 2002, pp. 1-15.
Schul International Co., LLC., Firejoint 2FR-H, Fire Rated Expansion Joint 2 Hour Fire Rated, labeled Copyright 2012, pp. 1-2.
Willseal LLC, Product Data Sheet, Willseal FR-H, Horizontal 2 and 3 hour fire rated seal, labeled Copyright 2013, pp. 1-2.
Schul International Co., LLC., Firejoint 2FR-V, Fire Rated Expansion Joint- 2 Hour Fire Rated, labeled Copyright 2012, pp. 1-2.
Willseal LLC, Product Data Sheet, Willseal FR-V, Vertical 2 and 3 hour fire rated seal, labeled Copyright 2013, pp. 1-2.
UL Online Certifications Directory, System No. FF-D-0082, XHBN.FF-D-0082 Joint Systems, Jul. 29, 2013, pp. 1-2.
UL Online Certifications Directory, System No. FF-D-1100, XHBN.FF-D-1100 Joint Systems, Sep. 24, 2012, pp. 1-2.
UL Online Certifications Directory, System No. WW-D-2013, XHBN.WW-D-2013 Joint Systems, May 27, 2004, pp. 1-2.
UL Online Certifications Directory, System No. FF-D-2008, XHBN.FF-D-2008 Joint Systems, Mar. 31, 2003, pp. 1-2.
UL Online Certifications Directory, System No. FF-D-1053, XHBN.FF-D-1053 Joint Systems, Nov. 28, 2007, pp. 1-2.
UL Online Certifications Directory, System No. WW-D-3005, XHBN.WW-D-3005 Joint Systems, Nov. 15, 1999, pp. 1-2.
UL Online Certifications Directory, XHHW.R8196 Fill, Void or Cavity Materials, labeled Copyright 2014, pp. 1.
UL Online Certifications Directory, XHBN.FF-D-0075 Joint Systems, Apr. 30, 2010, pp. 1-2.
UL Online Certifications Directory, System No. FF-D-0075, XHBN.FF-D-0075 Joint Systems, Aug. 21, 2014, pp. 1-2.
UL Online Certifications Directory, XHBN.FF-D-0094 Joint Systems, Sep. 11, 2013, pp. 1-2.
UL Online Certifications Directory, XHBN.FF-D-1121 Joint Systems, Apr. 25, 2013, pp. 1-2.
UL Online Certifications Directory, System No. FF-D-2006, XHBN.FF-D-2006 Joint Systems, Jun. 28, 2002, pp. 1-3.
Underwriters Laboratories (UK) Ltd., Assessment Report, Project Number: 12CA37234, Aug. 24, 2012, pp. 1-20.
Emseal Joint Systems, Ltd., 2 inch Quietjoint—concrete to concrete, Part No. SHH_2_WW_CONC, Mar. 25, 2014, p. 1.
Emseal Joint Systems, Ltd., 2 inch Quietjoint—gypsum to gypsum, Part No. SHH_2_WW_GYP, Mar. 25, 2014, p. 1.
Emseal Joint Systems, Ltd., 2 inch Quietjoint at concrete wall to window, Part No. SHG_2_WW_CONC_TO_GLASS_INSIDE_CORNER, Mar. 25, 2014, p. 1.
Emseal Joint Systems, Ltd., 2 inch Quietjoint at Gypsum Wall to Window, Part No. SHG_2_WW_GL_INSIDE_CORNER_GYP, Mar. 25, 2014, p. 1.
Emseal Joint Systems, Ltd., 2 inch Quietjoint—Concrete to Concrete at Head of Wall, Part No. SHH_2_HW_CONC_INSIDE_CORNER, Mar. 25, 2014, p. 1.
Emseal Joint Systems, Ltd., 2 inch Quietjoint—Gypsum to Concrete at Head of Wall, Part No. SHH_HW_GYP_CONC_INSIDE_CORNER, Mar. 25, 2014, p. 1.
Emseal Joint Systems, Ltd., 2 inch Quietjoint at Wall Partition to Window, Part No. SHG_2_WW_GL_INSIDE_CORNER_WALL_PARTITION_WINDOW, Mar. 25, 2014, p. 1.
Emseal Joint Systems, Ltd., Emshield DFR3 MSDS, last modified Sep. 3, 2014, p. 1.
https://www.google.com/search, seismic colorseal 5130176 "5,130,176", printed on Oct. 12, 2014, p. 1.
http://www.amazon.com, search for emseal 8,739,495, 1-16 of 624 results for emseal 8,739,495, printed on Oct. 13, 2014, pp. 1-5.
http://www.amazon.com/QuietJoint-Acoustic-Partition-Closure-2-sided, QuietJoint Acoustic Partition Closure for 3 inch (75mm) Joint, 10 foot (3m), printed on Sep. 29, 2014, pp. 1-3.

(56) References Cited

OTHER PUBLICATIONS http://www.amazon.com/QuietJoint-Acoustic-Partition-Closure-3-sided, QuietJoint Acoustic Partition Closure for 5/8 inch (15 mm) Joint, 10 foot (3m), printed on Oct. 13, 2014, pp. 1-3.
Illbruck, Illmod 2d, Product Information, 2002, pp. 1-2.
Emseal Joint Systems, Ltd., Laminations as a Build Choice—The Anatomy of Quality in Pre-Compressed Foam Sealants, last modified Jul. 30, 2013, pp. 1-3.
DIN 4102-1, Fire Behaviour of Building Materials and Elements. Part 1, May 1998, pp. 1-33.
DIN 4102-15, Fire Behaviour of Building Materials and Elements, Part 15, May 1990, pp. 1-15.
DIN 18542, Impregnated Cellular Plastics Strips for Sealing External Joints, Jan. 1999, pp. 1-10.
ASTM International, Standard Test Method for Surface Burning Characteristics of Building Materials, Designation: E-84-04, Feb. 2004, pp. 1-19.
Illbruck Bau-Technik GmbH, Illbruck Illmod 600, Jan. 2002, pp. 1-2.
Illbruck Sealant Systems, Inc., Illbruck Willseal 600, 2001, pp. 1-2.
Schul International, Co., LLC., Seismic Sealtite II, Colorized, Pre-compressed Joint Sealant for Vertical Applications, Technical Data, 2006, pp. 1-2.
MM Systems Corp., MM DSS Expansion Joint, Dual Seal Self-Expanding Seismic System, Feb. 18, 2008, pp. 1-2.
Order Granting Request for Ex Parte Reexamination for U.S. Pat. No. 8,739,495, Dec. 12, 2014, Control No. 90/013,395, pp. 1-19.
Emseal Joint Systems, Ltd., Fire-Rating of Emseal 20H System, Feb. 17, 1993, p. 1.
C:\WP\SLSMTG\20HDBJ.TBL Apr. 18, 1993, 20H- Description, Benefits, Justification, p. 1.
Order Granting Request for Ex Parte Reexamination for U.S. Pat. No. 8,813,449, Feb. 11, 2015, Control No. 90/013,428, pp. 1-19.
Watson Bowman Acme, Wabo Seismic Parking Deck Exp. Joints, Sales Drawing, Feb. 6, 1988, 3 pgs.
Emseal Corp., Horizontal Colorseal Data Sheet, Jun. 1997, 3 pgs.
Emseal Corp., Horizontal Colorseal Beneath Coverplate Product Design Drawing, Oct. 2000, 1 pg.
Emseal Corp., 20H System Data Sheet, Sep. 1996, pp. 1-2.
Watson Bowman Acme, Product Catalog, Feb. 1993, pp. 1-8.
Emseal Joint Systems, Watertight by Design, Buyline 0339, Copyrighted 1996 and marked Jan. 1999, 8 pgs.
Dow Corning, Down Corning 790 Silicone Building Sealant Data Sheet, Copyrighted 1995, 1999, 8 pgs.
Emseal Joint Systems, Sealing Joints in the Building Envelope: Principles, Products & Practices, Copyright date of 1999, 39 pgs.
Emseal Joint Systems, Product Catalog, Copyright date of 1987, 16 pgs.
Emseal Joint Systems, 20H-Compression Seal Comparison, Apr. 12, 1994, 1 pg.
Emseal Joint Systems, Ltd., Emseal Joint Systems, Marketing Brochure, Jan. 1997, 8 pgs.
City of San Diego, CWP Guidelines, Feb. 1992, pp. 1-13.
www.stifirestop.com, Specified Technologies, Inc., Product Data Sheet, Series ES Elastomeric Sealant, Copyright 2004, pp. 1-4.
www.stifirestop.com, Specified Technologies, Inc., Product Data Sheet, Pensil PEN300 Silicone Sealant, Copyright 2004, pp. 1-4.
Snapshot of Office Action issued in U.S. Appl. No. 14/540,514; printed in 2015, 22 pages.
Snapshot of Office Action issued in U.S. Appl. No. 90/013,395; printed in 2015, 27 pages.
Attached Comment regarding previously cited DE 102005054375 A1 and Machine English Translation thereof which may contain a machine translation error, and Verified English Translation submitted herewith as replacement; 2015; 1 page.
List of several Emseal pending patent applications and patents, and Examiners assigned thereto; Apr. 2015; 2 pages.
Notification of Transmittal of International Preliminary Report on Patentability in PCT/US14/32212; Mar. 13, 2015; 4 pages.
Snapshot of Office Actions issued in U.S. Appl. No. 13/729,500; printed in 2015; 35 pages.
Snapshot of Office Actions issued in U.S. Appl. No. 14/278,210; printed in 2015; 27 pages.
Snapshot of Office Actions issued in U.S. Appl. No. 12/635,062; printed in 2015; 88 pages.
Snapshot of Office Actions issued in U.S. Appl. No. 13/731,327; printed in 2015; 42 pages.
Snapshot of Office Action issued in U.S. Appl. No. 14/455,398; printed in 2015; 9 pages.
Snapshot of Office Actions issued in U.S. Appl. No. 13/652,021; printed in 2015; 34 pages.
Snapshot of Office Actions issued in U.S. Appl. No. 14/080,960; printed in 2015; 10 pages.
Snapshot of Office Actions issued in U.S. Appl. No. 14/084,930; printed in 2015; 7 pages.
Snapshot of Office Action issued in U.S. Appl. No. 14/229,463; printed in 2015; 20 pages.
Snapshot of Office Action issued in U.S. Appl. No. 14/455,403; printed in 2015; 12 pages.
Snapshot of Office Action issued in U.S. Appl. No. 14/211,694; printed in 2015; 6 pages.
Adolf Wurth GmbH & Co., KG, Elastic Joint Sealing Tape, labeled Copyright 2000-2003, pp. 1-7.
Expanding PU Foam, Technical Data Sheet, Feb. 1997, pp. 1-2.
ASTM International, Designation: E 84-04, Standard Test Method for Surface Burning Characteristics of Building Materials, Feb. 2004, pp. 1-19.
ASTM International, Designation: E 176-07, Standard Terminology of Fire Standards, Oct. 2007, pp. 1-20.
Auburn Manufacturing Company, Auburn Product News, Flame Retardant Silicone Sponge, 2007, p. 1.
British Board of Agrement, Agrement Certificate No. 97/3331, Second Issue, Compriband Super, 2005, pp. 1-4.
British Board of Agrement, Agrement Certificate No. 96/3309, Third Issue, Illmod 600 Sealing Tapes, 2003, pp. 1-8.
Nederland Normalistie-Instituut, Experimental Determination of the Fire Resistance of Elements of Building Construction, NEN 6069, Oct. 1991, English Translation, pp. 1-30.
British Standards Institution, Fire Tests on Building Materials and Structures, BS 476: Part 20: 1987, pp. 1-44.
DIN Deutsches Institut for Normung e.V., DIN 18542, Impregnated Cellular Plastics Strips for Sealing External Joints, Requirements and Testing, Jan. 1999, pp. 1-10.
www.BuildingTalk.com, Emseal Joint Systems, Choosing a Sealant for Building Applications, Hensley. May 21, 2007, pp. 1-6.
Netherlands Organization for Applied Scientific Research (TNO), Determination of the Fire Resistance According to NEN 6069 of Joints in a Wall Sealed with Cocoband 6069 Impregnated Foam Strip, Nov. 1996, pp. 1-19.
DIN Deutsches Institut fur Normung e.V., Fire Behaviour of Building Materials and Elements, Part 1: Classification of Building Materials, Requirements and Testing, DIN 4102-1, May 1998, pp. 1-33.
DIN Deusches Instut fur Normung e.V, Fire Behaviour of Building Materials and Elements, Overview and Design of Classified Building Materials, Elements and Components, DIN 4102-4, Mar. 1994, pp. 1-144.
DOW Corning Corporation, Dow Corning 790, Silicone Building Sealant, labeled Copyright 2000, pp. 1-6.
DOW Corning Corporation, Dow Corning 790, Silicone Building Sealant, Product Information, labeled Copyright 2000-2004, pp. 1-4.
DOW Corning Corporation, Dow Corning Firestop 400 Acrylic Sealant, 2001, pp. 1-4.
DOW Corning Corporation, Dow Corning Firestop 700 Silicone Sealant, 2001, pp. 1-6.
Emseal Joint Systems, Horizontal Colorseal, Aug. 2000, pp. 1-2.
Emseal Joint Systems, Ltd., Colorseal PC/SA Stick STD/001-0-00-00, 1995, p. 1.
Emseal Joint Systems, Ltd., 20H System, Tech Data, Jun. 1997, pp. 1-2.
Emseal Joint Systems, Ltd., Colorseal, Aug. 2000, pp. 1-2.

(56) References Cited

OTHER PUBLICATIONS

Emseal Joint Systems, Ltd., DSH System, Watertight Joint System for Decks, Tech Data, Nov. 2005, pp. 1-2.
Emseal Joint Systems, Ltd., Fire-Rating of Emseal 20H System, Feb. 17, 1993, p. 1-2.
Emseal Joint Systems, Ltd., Preformed Sealants and Expansion Joint Systems, May 2002, pp. 1-4.
Emseal Joint Systems, Ltd., Pre-Formed Sealants and Expansion Joints, Jan. 2002, pp. 1-4.
Emseal Joint Systems, Ltd., Seismic Colorseal, Aug. 2000, pp. 1-2.
Emseal Joint Systems, Ltd., Seismic Colorseal-DS (Double-Sided) Apr. 12, 2007, pp. 1-4.
Environmental Seals, Ltd., Envirograf, Fire Kills: Stop it today with fire stopping products for building gaps and openings, 2004, pp. 1-8.
Fire Retardants, Inc., Fire Barrier CP 25WB+Caulk, labeled Copyright 2002, pp. 1-4.
Ilbuck Bau-Poduke GmbH u. Co. KG., willseal firestop, Product Information Joint Sealing Tape for the Fire Protection Joint, Sep. 30, 1995, pp. 1-9.
Illbruck, willseal, The Joint Sealing Tape, 1991, pp. 1-19.
Illbruck, willseal 600, Product Data Sheet, 2001, pp. 1-2.
Material Safety Data Sheet, Wilseal 150/250 and/or E.P.S., Jul. 21, 1986, pp. 1-2.
ISO 066, Technical Datasheet, blocostop F-120, 2002 p. 1.
MM Systems, ejp Expansion Joints, Expanding Impregnated Foam System, internet archive, wayback machine, Nov. 16, 2007, pp. 1-2.
MM Systems, ejp Expansion Joints, Colorjoint/SIF—Silicone Impregnated Foam System, internet archive, wayback machine, Nov. 16, 2007, pp. 1-2.
MM Systems, ColorJoint/SIF Series, Silicone Seal & Impregnated Expanding Foam, Spec Data, 2007, pp. 1-3.
Norton Performance Plastics Corporation, Norseal V740FR, Flame Retardant, UL Recognized Multi-Purpose Foam Sealant, labeled Copyright 1996, pp. 1-2.
Promat International, Ltd., Promaseal FyreStrip, Seals for Movement Joints in Floors/Walls, labeled Copyright 2006, pp. 1-4.
Promat International, Ltd., Promaseal Guide for Linear Gap Seals and Fire Stopping Systems, Jun. 2008, pp. 1-20.
Promat International, Ltd., Promaseal IBS Foam Strip, Penetration Seals on Floors/Walls, labeled Copyright 2004, pp. 1-6.
Promat International, Ltd., Safety Data Sheet, Promaseal IBS, May 25, 2007, pp. 1-3.
Schul International, Co., LLC., Color Econoseal, Technical Data, Premium Quailty Joint Sealant for Waterproof Vertical and Horizontal Applications, 2005, pp. 1-2.
Schul International, Co., LLC., Sealtite Airstop FR, Air and Sound Infiltration Barrier, labeled Copyright Apr. 1997, p. 1.
Schul International, Co., LLC., Sealtite Standard, Pre-compressed Joint Sealant, High Density, Polyurethane Foam, Waterproofs Vertical Applications, 2007.
Snapshot of Notice of Allowance issued in U.S. Appl. No. 14/080,960; printed in 2015, 5 pages.
Decision Granting Ex Parte Reexamination on Control No. 90/013,473, May 19, 2015, 13 pages.
U.S. Appl. No. 60/953,703, filed Aug. 3, 2007 underlying U.S. Pat. No. 8,397,453, 24 pages.
Emseal Horizontal Colorseal Tech Data, dated Jun. 1997.
DIN 4102, Part 2, Fire Behaviour of Building Materials and Building Components, Sep. 1977.
Emseal Joint Systems, Lt., Preformed Sealants and Expansion Joint Systems, May 2002, pp. 1-4.
Emseal Joint System, Ltd., Tech Data DSH System, Jan. 2000, pp. 1-2.
Emseal Joint Systems, Ltd., Emseal CAD.dwg, Oct. 2000, 7 pages.
Emseal Joint Systems, Ltd., Installation Instructions: AST & IST Sealant Tapes, Dec. 1998, p. 1.
Emseal Joint Systems, Ltd., Emshield WFR2, Fire-Rated Expansion Joint Product Data, Jun. 2009, pp. 1-2.
Emseal Joint System, Ltd., 1/2 Inch Colorseal, Binary Seal System Components, document dated Nov. 24, 1992, p. 1.
Schul International Co., LLC., Sealtite VP (600) Technical Data, Premium Quality Pre-compressed Joint Sealant for Weather tight, Vapor Permeable, Vertical Applications, labeled Copyright 1997-2002, pp. 1-2.
Schul International Co., LLC., Seismic Sealtite, Technical Data, Colorized, Pre-compressed Joint Sealant for Vertical Applications, 2005, pp. 1-2.
Schul International Co., LLC., Sealtite 50N, Technical Data, Premium Quality Pre-compressed Joint Sealant for Horizontal Applications, labeled Copyright 2002, pp. 1-2.
Schul International Co., LLC., HydroStop, Expansion Joint System, 2005, pp. 1-2.
Schul International Co., LL., Sealtite, The Most Complete Line of Pre-compressed Sealants, web archive.org, wayback machine, printed 2014, pp. 1-3.
Sealant, Waterproofing & Restoration Institute, Sealants: The Professional Guide, labeled Copyright 1995, Chapter II-Sealants, p. 26, pp. 1-3.
Tremco Illbruck, Cocoband 6069, 2007, p. 1 with English translation.
Tremco Illbruck, Alfacryl FR Intumescent Acrylic, Fire Rated, Emulsion Acrylic, Intumescent Sealant, 2007, pp. 1-2.
Tremco Illbruck, Alfasil FR, Fire Rated, Low Modulus, Neutral Cure Silicone Sealant, 2007, pp. 1-2.
Tremco Illbruck, Compriband 600, Impregnated Joint Sealing Tape, 2007, pp. 1-2.
Tremco Illbruck, Ltd., Technical Data Sheet, Compriband Super FR, Issue 2, Oct. 18, 10, 2004, pp. 1-4.
Tremco Illbruck, Ltd., Technical Data Sheet, Compriband Super, Issue 1, Sep. 29, 2004, pp. 1-3.
Tremco Illbruck, Alfas Bond FR, 2007, pp. 1-2.
Tremco Illbruck, Illmod 600, Jun. 2006, pp. 1-2.
Tremco Illbruck, The Specification Product Range, 2007, pp. 1-36.
Tremco Illbruck, Webbflex B1 PU Foam, Fire Rated Expanding Polyurethane Foam, pp. 1-2.
UL Online Certifications Directory, System No. WW-S-0007, XHBN.WW-S-0007, Joint Systems, Dec. 5, 1997, pp. 1-3.
UL Online Certifications Directory, BXUV.GuideInfo, Fire-Resistance Ratings ANSI/UL 263, last updated Jun. 26, 2014, pp. 1-24.
Frangi et al., German language, Zum Brandverhalten von Holzdecken aus Hohlkasten-elementen, Institut fur Baustatik und Konstrucktion, Jun. 1999, pp. 1-130.
ASTM International, Designation: E 1966-01, Standard Test Method for Fire-Resistive Joint Systems, pp. 1-15.
www.businesswire.com, Celanese Introduces Mowilith Nano Technology Platform for the Next General of Exterior Coatings, May 8, 2007, Nurnberg, Germany, pp. 1-3.
Illbruck, Willseal firestop applied in the joints of the new Pfalz Theater in Kaiserlautern, pp. 1-2.
Dayton Superior Chemical & Cement Products, Marketing Update, Fall 2005, pp. 1-2.
Dow Corning Case Study EU Parliament, Brussels, p. 1.
Dow Corning Silicone Sealants, Dow Corning 790 Silicone Building Sealant, Ultra-low-modulus sealant for new and remedial construction joint sealing applications, labeled Copyright 2000-2005, pp. 1-2.
Dow Corning, John D. Farrell Letter to Emseal USA, Wilford Brewer, reference: Emseal Greyflex, Oct. 4, 1984, p. 1.
Dow Corning letter to Customer, Reference: Sealant Certification for Dow Corning 790 Silicone Building Sealant, p. 1.
Emseal Joint Systems, Ltd., Greyflex & Backerseal Wet Sealant Compatibility Chart, Test Data, Sep. 1991, p. 1.
Emseal Joint Systems, Emseal preformed expanding foam sealant, 07920/MAN, pp. 1-2.
Colorseal by Emseal Specification Sections 07 90 00/ 07 95 00, pp. 1-4.
Emseal Joint Systems, Ltd., Emseal Color-seal, Tech Data, pp. 1-2.
Emseal Joint Systems, Ltd., Emseal Color-Seal, p. 1.
www.emseal.com/products, Horizonta Colorseal by Emseal Expansion Joints and Pre-Compressed Sealants, last modified Sep. 19, 2014.
Horizontal Colorseal by Emseal, Specification Sections 07 90 00/ 07 95 00, pp. 1-4.

(56) References Cited

OTHER PUBLICATIONS

Emseal Material Safety Data Sheet, Acrylic Loghome Tape, pp. 1-2.
Seismic Colorseal by Emseal Specification Sections 07 90 00/ 07 95 00, pp. 1-4.
Emseal Joint Systems, Ltd., Summary Guide Specification, p. 1.
Emseal Joint Systems, The complete package for all joint requirements, 1988, pp. 1-6.
Envirograf, Cavity Barriers Fire Seal Range, Technical Data, pp. 1-32.
web.archive.org, www.envirograf.com, Product 40: Intumescent-Coated Fireproof Sponge (patented), labeled Copyright 2007, pp. 1-2.
web.archive.org, www.envirograf.com, Product 5: Intumescent-Caoted Non-Fibrous Slabs (patented), labeled Copyright Apr. 10, 2007, p. 1.
afk Yapi Elemanlari, Hannoband- BSB Bg1, Fire prevention tape Flame resistand pursuant to DIN 4102 T1, Technical Data Sheet, pp. 1-4.
Hanno Dicht-und Dammsysteme, Hannoband- BG1, High Performance am Bau, German language, 2000, pp. 1-6.
Illbruck, willseal firestop fur die Brandschutz-Fuge, Information, German language, pp. 1-2.
Illbruck Sealant Systems, Cocoband 6069, Productinfomatie, Dutch language, 2003, pp. 1-2.
Illbruck Sealant Systems, Inc., Sealant Products and Systems, 2002, pp. 1-12.
Illbruck, Will-Seal, 3.0 Construction Requirements, pp. 1-8.
Sealtite Joint Sealants, What is the material used in the U-Channel? pp. 1-4.
Snapshot of Notice of Allowance for U.S. Appl. No. 12/635,062; Oct. 9, 2015, 5 pages.
Snapshot of Office Action for U.S. Appl. No. 90/013,511; Oct. 23, 2015, 28 pages.
Decision Granting Ex Parte Reexamination on Control No. 90/013,565; Sep. 29, 2015, 19 pages.
Snapshot of Office Action issued in U.S. Appl. No. 90/013,395; printed in 2015, 48 pages.
Snapshot of Office Action issued in U.S. Appl. No. 90/013,428; printed in 2015, 23 pages.
Snapshot of Office Action issued in U.S. Appl. No. 90/013,472; printed in 2015, 22 pages.
Snapshot of Office Action issued in U.S. Appl. No. 90/013,473; printed in 2015, 22 pages.
3M; Fire Barrier CP 25WB+Caulk, Product Data Sheet, Copyright 3M 2001, 4 pages.
Tremco Incorporated, "Firestop Submittal" Data Sheet collections, Certificate of Conformance dated Nov. 2004, 47 pages; publication date unknown from document.
Ashida, Polyurethane and Related Foams, Chapter three: Fundamentals, p. 43, pp. 1-3; publication date unknown from document.
Emseal GreyFlex Expanding Foam Sealant for Facades, p. 1, publication date unknown from document.
Everlastic Wide Joint Seal, pp. 1-3, http://williamsproducts.net/wide.html[Oct. 7, 2014 3:37:39 PM], publication date unknown from document.
Illbruck, Sealtite-willseal, Plant Bodenwohr, pp. 1-17, publication date unknown from document.
ISO-Chemie, ISO BLOCO 600, solukumitiiviste, Finnish language, pp. 1-2; publication date unknown from document.
ISO-Chemie, ISO BLOCO 600, Produktbeskrivelse, Norwegian language, DK B-110811; pp. 1-2; publication date unknown from document.
Plastics Flammability Handbook, pp. 52, 59, and 69, 3 pages; publication date unknown from document.
Product Data Sheet, Art. No. 4.22.01, Compriband MPA, pp. 1-2.
Quelfire, Intufoam, pp. 1-4; publication date unknown from document.
Quelfire, Passive Fire Protection Products, catalog, pp. 1-68; publication date unknown from document.
Sandell, Manufacturing Company, Inc., Polytite Sealant and Construction Gasket, p. 1; publication date unknown from document.
Sealtite-willseal Joint Sealants, Equivalency Chart for Joint Sealants, p. 1; publication date unknown from document.
Tremco Illbruck Ltd., Technical Data Sheet, ALFASIL FR, pp. 1-2, Issue 3, Oct. 22, 2007.
UL 1715 Fire Test of Interior Finish Material, p. 1, http://ulstandardsinfonet.ul.com/scopes/1715.html [Oct. 7, 2014 3:27:15 PM], publication date unknown from document.
Will-Seal Construction Foams, Will-seal is Tested to Perform, p. 1, publication date unknown from document.
Will-Seal Precompressed Foam Sealant, How Will-Seal Works, p. 1, publication date unknown from document.
Williams Products, Inc., Everlastic Fire Classifed Closures 1715, pp. 1-3, http://williamsproducts.net/fire_classified_1715.html[Oct. 7, 2014 3:26:33 PM], publication date unknown from document.
Williams Products, Inc., Installation for partion closures, p. 1, publication date unknown from document.
Snapshot of Final Office Action for U.S. Appl. No. 90/013,473; Nov. 6, 2015, 38 pages.
ACI 504-R, Guide to Sealing Joint in Concrete Structures, ACI Committee 504, 1997, 44 pages.
Snapshot of Office Action issued in U.S. Appl. No. 14/211,694; printed in 2015, 14 pages.
Snapshot of Office Action issued in U.S. Appl. No. 13/652,021; printed in 2015, 13 pages.
Snapshot of Office Action issued in U.S. Appl. No. 90/013,511; printed in 2015, 24 pages.
Snapshot of Office Action issued in U.S. Appl. No. 14/278,210; printed in 2015, 11 pages.
Snapshot of Decision Granting Ex-Parte Reexamination issued in U.S. Appl. No. 90/013,472; printed in 2015; 25 pages.
Snapshot of Notice of Allowance issued in U.S. Appl. No. 14/229,463; printed in 2015; 8 pages.
Snapshot of Notice of Allowance issued in U.S. Appl. No. 13/731,327; printed in 2015, 8 pages.
Defendants' Joint Second Amended Preliminary Invalidity Contentions received at MKG Jun. 30, 2015, Appendix A, 7 pgs.
Defendants' Joint Second Amended Preliminary Invalidity Contentions received at MKG Jun. 30, 2015, Appendix B-1, 346 pgs.
Defendants' Joint Second Amended Preliminary Invalidity Contentions received at MKG Jun. 30, 2015, Appendix B-2, 314 pgs.
Defendants' Joint Second Amended Preliminary Invalidity Contentions received at MKG Jun. 30, 2015, Appendix C, 159 pgs.
Defendants' Joint Second Amended Preliminary Invalidity Contentions received at MKG Jun. 30, 2015, Appendix D, 5 pgs.
Defendants' Joint Second Amended Preliminary Invalidity Contentions received at MKG Jun. 30, 2015, 1:14-cv-00358-SM, 27 pgs. total.
DIN 4102-16, Fire Behaviour of Building Materials and Elements, Part 16, May 1998, pp. 1-12.
2000 Fire Resistance Directory, p. 1012; publication date unknown from document.
Firestop Submittal Package, Fire Resistive Joint Systems—Waterproofing, SpecSeal Firestop Products, Specified Technologies, Inc, Somerville NJ; p. 1-37, publication date unknown from document.
Specified Technologies Inc., Product Data Sheet, Series ES, Elastomeric Sealant, Copyright 2000, p. 1-4.
Specified Technologies Inc., Product Data Sheet, PEN200 Silicone Foam, Copyright 2003, p. 1-2.
ISO-Chemie GmbH, Schul International Co., Order Confirmation, Doc. No. 135652, Customer No. 38012, Date, Apr. 26, 2007, p. 1-3.
Dow Corning 890 Self-Leveling Silicone Joint Sealant; Dow Corning Corporation; 1996, 1999.
Emseal, BEJS SYSTEM—Bridge Expansion Joint System, May 26, 2010, 5 pages.
Emseal, EMSEAL ACRYLIC Log Home Tape Installation Instructions, Jun. 2011, 1 page.
Snapshot of Notice of Allowance for U.S. Appl. No. 13/652,021; Jan. 8, 2016, 7 pages.
Snapshot of Non-Final Office Action for U.S. Appl. No. 14/084,930; Jan. 12, 2016, 11 pages.

(56) References Cited

OTHER PUBLICATIONS

Snapshot of Office Action in Ex Parte Reexamination for 90/013,395; Jan. 20, 2016, 26 pages.
Snapshot of Notice of Intent to Issue Ex Patent Reexamination Certificate for 90/013,472; Feb. 19, 2016, 8 pages.
Snapshot of Final Office Action for U.S. Appl. No. 90/013,511; Feb. 26, 2016, 45 pages.
Snapshot of Advisory Action for U.S. Appl. No. 90/013,472-90/013,473; Dec. 28, 2015, 13 pages.
Snapshot of Non-Final Office Action for U.S. Appl. No. 90/013,428; Jan. 5, 2016, 14 pages.
Snapshot of Non-Final Office Action for U.S. Appl. No. 90/013,565; Jan. 8, 2016, 20 pages.
Snapshot of Final Office Action for U.S. Appl. No. 14/540,514; Mar. 31, 2016, 18 pages.
Emseal Corporation, Seismic Colorseal by Emseal, "Last Modified": Aug. 21, 2007, 4 pages.
Emseal Joint Systems, Ltd., Backerseal (Greyflex), Sep. 2001, 2 pages.
Emseal Joint Systems, Ltd., Install Data—Horizontal Colorseal—With Expoxy Adhesive, Jun. 2006, 2 pages.
Snapshot of Final Office Action for U.S. Appl. No. 14/211694; Mar. 21, 2016, 16 pages.
Snapshot of Final Office Action for U.S. Appl. No. 14/455,398; Mar. 29, 2016, 12 pages.
Snapshot of Ex Parte Reexamination Certificate No. U.S. Pat. No. 6,532,708C1 for U.S. Appl. No. 90/013,472; Mar. 23, 2016, 3 pages.
Snapshot of Office Action for U.S. Appl. No. 90/013,395; Apr. 7, 2016, 37 pages.
Snapshot of Office Action for U.S. Appl. No. 90/013,565; Apr. 8, 2016, 48 pages.
Emseal Joint Systems, Ltd., BEJS System Tech Data, Mar. 2009, 2 pages.
Emseal's new Universal-90 expansion joints, Buildingtalk, Pro-Talk Ltd., Mar. 27, 2009, 2 pages.
Emseal Joint Systems, Ltd., Emseal Emshield DFR2 System DFR3 System Tech Data, May 2010, 4 pages.
Emseal Seismic Colorseal, Aug. 21, 2007, 4 pages.
Emseal Joint Systems, Ltd., Emseal New Universal 90's Watertight, Factory Fabricated Upturn/Downturn Transition Pieces for Ensuring Continuity of Seal, Aug. 4, 2009, 4 pages.
Snapshot of Office Action for U.S. Appl. No. 90/013,428; May 6, 2016, 22 pages.
Snapshot of Office Action for U.S. Appl. No. 14/950,923; May 6, 2016, 13 pages.
Snapshot of Office Action for U.S. Appl. No. 14/730,896; May 9, 2016, 18 pages.
Snapshot of Office Action for U.S. Appl. No. 14/229,463; May 12, 2016, 14 pages.
Snapshot of Advisory Action for U.S. Appl. No. 90/013,511; May 9, 2016, 12 pages.
Snapshot of Ex Parte Reexamination Certificate No. U.S. Pat. No. 6,532,708C2 for U.S. Appl. No. 90/013,683; Jun. 7, 2016, 2 pages.
Snapshot of Office Action for U.S. Appl. No. 14/278,210; May 19, 2016, 12 pages.
Snapshot of Office Action for U.S. Appl. No. 14/511,394; May 13, 2016, 6 pages.
Snapshot of Advisory Action for U.S. Appl. No. 90/013,395; May 20, 2016, 4 pages.
Snapshot of Advisory Action for U.S. Appl. No. 90/013,565; Jul. 19, 2016, 5 pages.
Mercury et al., "On the Decomposition of Synthetic Gibbsite Studied by Neutron Thermodiffractometry", J. Am. Ceram, Soc. 89, (2006), pp. 3728-3733.
Brydon et al., "The Nature of Aluminum Hydroxide-Montmorillonite Complexes", The American Mineralogist, vol. 51, May-Jun. 1966, pp. 875-889.
Huber, Alumina Trihydrate (ATH), A Versatile Pigment for Coatings, Inks, Adhesives, Caulks and Sealants Applications, Dec. 2005, 5 pgs.
3.3.3.8 Thermal Stability/Loss on Ignition/Endotheric Heat, Figure 3.9, 1 pg.
Snapshot of Examiner's Interview Summary for U.S. Appl. No. 90/013,511; Aug. 26, 2016, 9 pages.
Snapshot of Advisory Action for U.S. Appl. No. 90/013,428; Sep. 8, 2016, 13 pages.
Snapshot of Intent to Issue Ex Parte Reexamination Certificate for 90/013,428; Oct. 31, 2016, 7 pages.
Snapshot of Ex Parte Reexamination Certificate for 90/013,511; Oct. 31, 2016, 3 pages.
Snapshot of Ex Parte Reexamination Certificate for U.S. Appl. No. 90/013,565; Nov. 2, 2016, 3 pages.
Snapshot of Advisory Action for U.S. Appl. No. 90/013,395; Sep. 14, 2016, 16 pages.
Snapshot of Intent to Issue Ex Parte Reexamination Certificate for 90/013,511; Sep. 21, 2016, 9 pages.
Snapshot of Intent to Issue Ex Parte Reexamination Certificate for 90/013,395; Oct. 6, 2016, 9 pages.
Snapshot of Intent to Issue Ex Parte Reexamination Certificate for 90/013,565; Oct. 7, 2016, 9 pages.
Snapshot of Ex Parte Reexamination Certificate for 90/013,428; Nov. 23, 2016, 3 pages.
Snapshot of Notice of Allowance for U.S. Appl. No. 14/540,514; Nov. 25, 2016, 4 pages.
Snapshot of Office Action for U.S. Appl. No. 14/278,210; Nov. 30, 2016, 12 pages.

* cited by examiner

FACTORY FABRICATED PRECOMPRESSED WATER AND/OR FIRE RESISTANT EXPANSION JOINT SYSTEM TRANSITION

CROSS REFERENCE TO RELATED APPLICATION

This application is a Continuation-in-Part Application of U.S. patent application Ser. No. 12/635,062, filed on Dec. 10, 2009, now U.S. Pat. No. 9,200,437, which claims the benefit of U.S. Provisional Patent Application No. 61/121,590, filed on Dec. 11, 2008, the contents of each of which are incorporated herein by reference in their entireties and the benefits of each are fully claimed. This application also is a Continuation-in-Part Application of U.S. patent application Ser. No. 13/729,500, filed on Dec. 28, 2012, which is a Continuation-in-Part Application of U.S. patent application Ser. No. 12/622,574, filed on Nov. 20, 2009, now U.S. Pat. No. 8,365,495 which includes reexamination certificate C1 issued Nov. 2, 2016, which claims the benefit of U.S. Provisional Patent Application No. 61/116,453, filed on Nov. 20, 2008, the contents of each of which are incorporated herein by reference in their entireties and the benefits of each are fully claimed.

TECHNICAL FIELD

The present invention relates generally to joint systems for use in concrete and other building systems and, more particularly, to expansion joints for accommodating thermal and/or seismic movements in such systems.

BACKGROUND OF THE INVENTION

Concrete structures and other building systems often incorporate joints that accommodate movements due to thermal and/or seismic conditions. These joint systems may be positioned to extend through both interior and exterior surfaces (e.g., walls, floors, and roofs) of a building or other structure.

In the case of an exterior joint in an exterior wall, roof, or floor exposed to external environmental conditions, the expansion joint system should also, to some degree, resist the effects of the external environment conditions. As such, most external expansion joints systems are designed to resist the effects of such conditions (particularly water). In vertical joints, such conditions will likely be in the form of rain, snow, or ice that is driven by wind. In horizontal joints, the conditions will likely be in the form of rain, standing water, snow, ice, and in some circumstances all of these at the same time. Additionally, some horizontal systems may be subjected to pedestrian and/or vehicular traffic.

Many expansion joint products do not fully consider the irregular nature of building expansion joints. It is common for an expansion joint to have several transition areas along the length thereof. These may be walls, parapets, columns, or other obstructions. As such, the expansion joint product, in some fashion or other, follows the joint as it traverses these obstructions. In many products, this is a point of weakness, as the homogeneous nature of the product is interrupted. Methods of handling these transitions include stitching, gluing, and welding. In many situations, it is difficult or impossible to prefabricate these expansion joint transitions, as the exact details of the expansion joint and any transitions and/or dimensions may not be known at the time of manufacturing.

In cases of this type, job site modifications are frequently made to facilitate the function of the product with regard to the actual conditions encountered. Normally, one of two situations occurs. In the first, the product is modified to suit the actual expansion joint conditions. In the second, the manufacturer is made aware of issues pertaining to jobsite modifications, and requests to modify the product are presented to the manufacturer in an effort to better accommodate the expansion joint conditions. In the first situation, there is a chance that a person installing the product does not possess the adequate tools or knowledge of the product to modify it in a way such that the product still performs as designed or such that a transition that is commensurate with the performance expected thereof can be effectively carried out. This can lead to a premature failure at the point of modification, which may result in subsequent damage to the property. In the second case, product is oftentimes returned to the manufacturer for rework, or it is simply scrapped and re-manufactured. Both return to the manufacturer and scrapping and re-manufacture are costly, and both result in delays with regard to the building construction, which can in itself be extremely costly.

SUMMARY OF THE INVENTION

The present invention is directed to fire and/or water resistant expansion joint systems for installation into building joints. In one aspect, the present invention resides in a fire and water resistant system for use in vertical or horizontal configurations and is designed such that it can be used for either an inside or outside corner. The system comprises a core having a fire retardant. A layer of an elastomer is disposed on the core and is tooled to define a profile to facilitate the compression of the expansion joint system when installed between coplanar substrates. The system can be delivered to a job site in a pre-compressed state ready for installation into the building joint.

In another aspect, the present invention resides in a fire and water resistant vertical expansion joint system comprising a first section of core extending in a horizontal plane and a second section of core extending in a vertical plane. An insert piece of core is located between the first and second sections, the insert piece being configured to transition the first section from the horizontal plane to the vertical plane of the second section. The core is infused with a fire retardant. A layer of an elastomer is disposed on the core to impart a substantially waterproof property thereto. The vertical expansion joint system is pre-compressed and is installable between horizontal coplanar substrates and vertical coplanar substrates. Although the vertical expansion joint system is described as having an angle of transition from horizontal to vertical, it should be understood that the transition of the angles is not limited to right angles as the vertical expansion joint system may be used to accommodate any angle.

In another aspect, the present invention resides in a fire and water resistant expansion joint system, comprising a core; and a fire retardant infused into the core. The core infused with the fire retardant is configured to define a profile to facilitate the compression of the expansion joint system when installed between substantially coplanar substrates, and the expansion joint system is angled around a corner.

In any embodiment, the construction or assembly of the systems described herein is generally carried out off-site, but elements of the system may be trimmed to appropriate length on-site. By constructing or assembling the systems of the present invention in a factory setting, on-site operations typically carried out by an installer (who may not have the appropriate tools or training for complex installation procedures) can be minimized. Accordingly, the opportunity for an installer to effect a modification such that the product does not perform as designed or such that a transition does not meet performance expectations is also minimized.

DETAILED DESCRIPTION

Embodiments of the present invention provide a resilient water resistant and/or fire resistant expansion joint system able to accommodate thermal, seismic, and other building movements while maintaining water resistance and/or fire resistance characteristics. Embodiments of present invention are especially suited for use in concrete buildings and other concrete structures including, but not limited to, parking garages, stadiums, tunnels, bridges, waste water treatment systems and plants, potable water treatment systems and plants, and the like.

Figure 1:
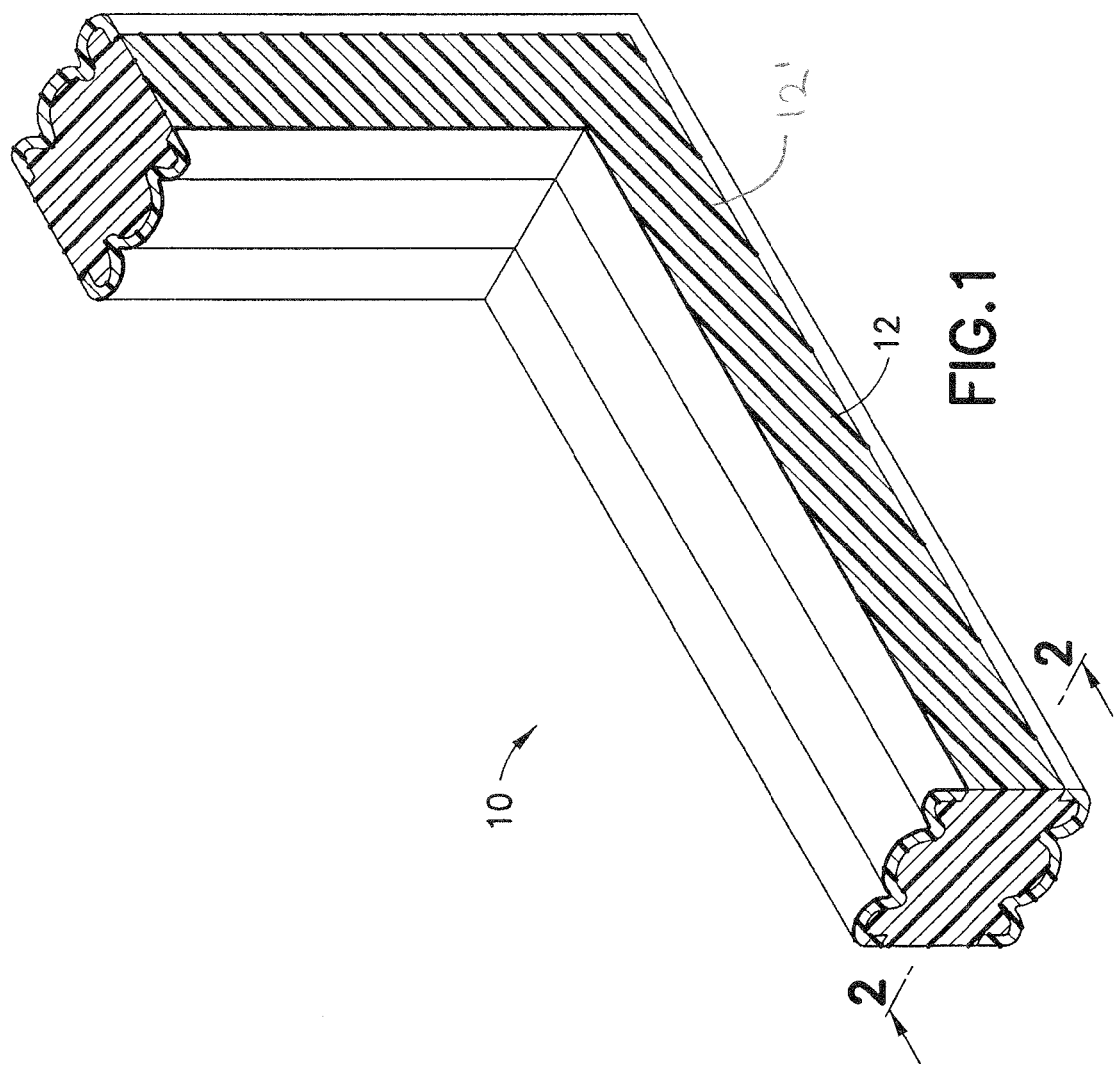
FIG. 1 is a perspective view of a vertical expansion joint system of the present invention.
Figure 2:
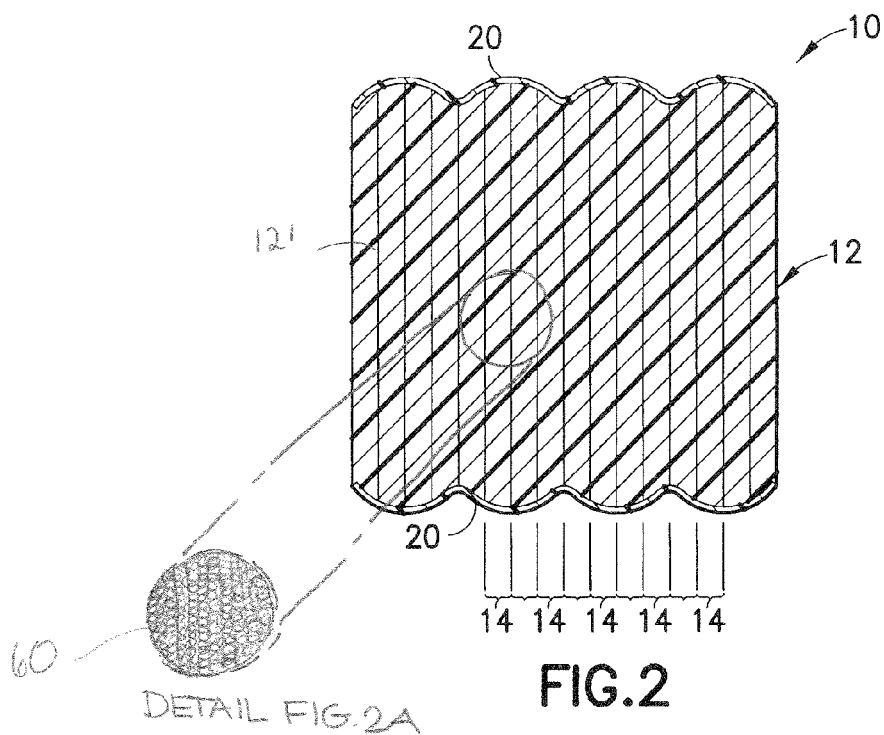
FIG. 2 is an end view of the vertical expansion joint system taken along line 2-2 of FIG. 1.
Figure 3:
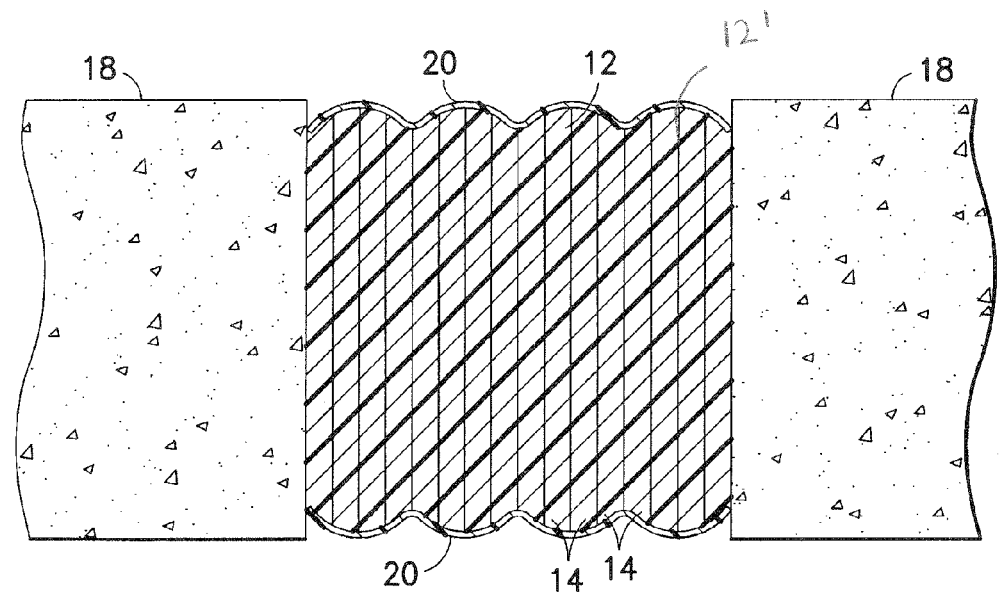
FIG. 3 is an end view of the vertical expansion joint system installed between two substrates.

Referring now to FIGS. 1-3, embodiments of the present invention include an expansion joint system oriented in a vertical plane and configured to transition corners at right angles. This system is designated generally by the reference number 10 and is hereinafter referred to as "vertical expansion joint system 10." It should be noted, however, that the vertical expansion joint system 10 is not limited to being configured at right angles, as the products and systems of the present invention can be configured to accommodate any desired angle. The vertical expansion joint system 10 comprises sections of a core 12', e.g., open or closed celled polyurethane foam 12 (hereinafter "foam 12" for ease of reference which is not meant to limit the core 12' to a foam material, but merely illustrate on exemplary material therefore) that may be infused with a material, such as a water-based acrylic chemistry, and/or other suitable material. As shown in Detail FIG. 2A, for example, the core 12' can be infused with a fire retardant material 60. Moreover, it should be understood, however, that the present invention is not limited to the use of polyurethane foam, as other foams are within the scope of the present invention, and other non-foam materials also can be used for the core 12', as explained below.

As is shown in FIG. 2, the core 12' and/or foam 12 can comprise individual laminations 14 of material, e.g., foam, one or more of which are infused with a suitable amount of material, e.g., such as the acrylic chemistry and/or fire retardant material 60. The individual laminations 14 can extend substantially perpendicular to the direction in which the joint extends and be constructed by infusing at least one, e.g., an inner lamination with an amount of fire retardant 60. It should be noted that the present invention is not so limited as other manners of constructing the core 12' and/or foam 12 are also possible. For example, the core 12' and/or foam 12 of the present invention is not limited to individual laminations 14 assembled to construct the laminate, as the core 12' and/or foam 12 may comprise a solid block of non-laminated foam or other material of fixed size depending upon the desired joint size, laminates comprising laminations oriented horizontally to adjacent laminations, e.g., parallel to the direction which the joint extends, or combinations of the foregoing.

Thus, foam 12 merely illustrates one suitable material for the core 12'. Accordingly, examples of materials for the core 12' include, but are not limited to, foam, e.g., polyurethane foam and/or polyether foam, and can be of an open cell or dense, closed cell construction. Further examples of materials for the core 12' include paper based products, cardboard, metal, plastics, thermoplastics, dense closed cell foam including polyurethane and polyether open or closed cell foam, cross-linked foam, neoprene foam rubber, urethane, ethyl vinyl acetate (EVA), silicone, a core chemistry (e.g., foam chemistry) which inherently imparts hydrophobic and/or fire resistant characteristics to the core; and/or composites. Combinations of any of the foregoing materials or other suitable material also can be employed. It is further noted that while foam 12 is primarily referred to herein as a material for the core 12', the descriptions for foam 12 also can apply to other materials for the core 12', as explained above.

The core 12' can be infused with a suitable material including, but not limited to, an acrylic, such as a water-based acrylic chemistry, a wax, a fire retardant material, ultraviolet (UV) stabilizers, and/or polymeric materials, combinations thereof, and so forth. A particularly suitable embodiment is a core 12' comprising an open celled foam infused with a water-based acrylic chemistry and/or a fire retardant material.

The amount of fire retardant material 60 that can be infused into the core 12', including the open celled foam embodiment, is between 3.5:1 and 4:1 by weight in ratio with the un-infused foam/core itself, according to embodiments. The resultant uncompressed foam/core, whether comprising a solid block or laminates, has a density of about 130 kg/m$^3$ to about 150 kg/m$^3$ and preferably about 140 kg/m$^3$. Other suitable densities for the resultant core 12' include between about 50 kg/m$^3$ and about 250 kg/m$^3$, e.g., between about 100 kg/m$^3$ and about 180 kg/m$^3$, and which are capable of providing desired water resistance and/or waterproofing characteristics to the structure. One type of fire retardant material 60 that may be used is water-based aluminum tri-hydrate (also known as aluminum tri-hydroxide (ATH)). The present invention is not limited in this regard, however, as other fire retardant materials may be used. Such materials include, but are not limited to, metal oxides and other metal hydroxides, aluminum oxides, antimony oxides and hydroxides, iron compounds such as ferrocene, molybdenum trioxide, nitrogen-based compounds, phosphorus based compounds, halogen based compounds, halogens, e.g., fluorine, chlorine, bromine, iodine, astatine, combinations of any of the foregoing materials, and other compounds capable of suppressing combustion and smoke formation. Also as is shown in FIG. 3, the vertical expansion joint system 10 is positionable between opposing substrates 18 (which may comprise concrete, glass, wood, stone, metal, or the like) to accommodate the movement thereof. In particular, opposing vertical surfaces of the core 12' and/or foam 12 can be retained between the edges of the substrates 18. The compression of the core 12' and/or foam 12 during the installation thereof between the substrates 18 enables the vertical expansion system 10 to be held in place.

In any embodiment, when individual laminations 14 are used, several laminations, the number depending on the expansion joint size (e.g., the width, which depends on the distance between opposing substrates 18 into which the vertical expansion system 10 is to be installed), can be compiled and then compressed and held at such compression in a fixture. The fixture, referred to as a coating fixture, is at a width slightly greater than that which the expansion joint will experience at the greatest possible movement thereof. Similarly, a core 12' comprising laminations of non-foam material or comprising a solid block of desired material may be compiled and then compressed and held at such compression in a suitable fixture.

In the fixture, the assembled infused laminations 14 or core 12' are coated with a coating, such as a waterproof elastomer 20 at one surface, according to embodiments. The elastomer 20 may comprise, for example, at least one polysulfide, silicone, acrylic, polyurethane, poly-epoxide, silyl-terminated polyether, combinations and formulations thereof, and the like, with or without other elastomeric components or similar suitable elastomeric coating or liquid sealant materials, or a mixture, blend, or other formulation of one or more the foregoing. One preferred elastomer 20 for coating core 12', e.g., for coating laminations 14 for a horizontal deck application where vehicular traffic is expected is PECORA 301 (available from Pecora Corporation, Harleysville, Pa.) or DOW 888 (available from Dow Corning Corporation, Midland, Mich.), both of which are traffic grade rated silicone pavement sealants. For vertical wall applications, a preferred elastomer 20 for coating, e.g., the laminations 14 is DOW 790 (available from Dow Corning Corporation, Midland, Mich.), DOW 795 (also available from Dow Corning Corporation), or PECORA 890 (available from Pecora Corporation, Harleysville, Pa.). A primer may be used depending on the nature of the adhesive characteristics of the elastomer 20. For example, a primer may be applied to the outer surfaces of the laminations 14 of foam 12 and/or core 12' prior to coating with the elastomer 20. Applying such a primer may facilitate the adhesion of the elastomer 20 to the foam 12 and/or core 12'.

During or after application of the elastomer 20 to the laminations 14 and/or core 12', the elastomer is tooled or otherwise configured to create a "bellows," "bullet," or other suitable profile such that the vertical expansion joint system 10 can be compressed in a uniform and aesthetic fashion while being maintained in a virtually tensionless environment.

The elastomer 20 is then allowed to cure while being maintained in this position, securely bonding it to the infused foam lamination 14 and/or core 12'.

Figure 4:
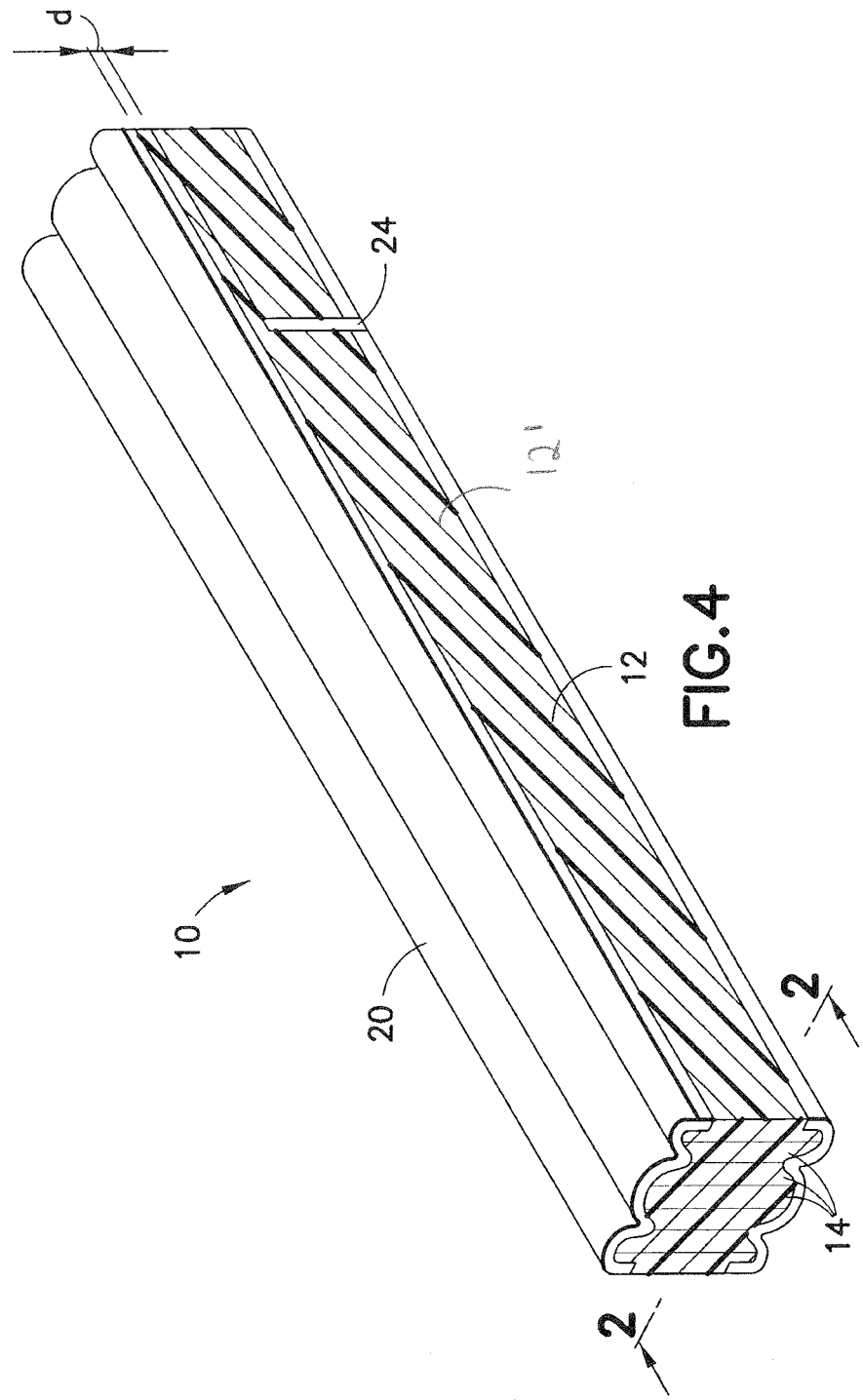
FIG. 4 is a perspective view of an assembly of laminations being prepared to produce the vertical expansion joint system of FIG. 1.
Figure 5:
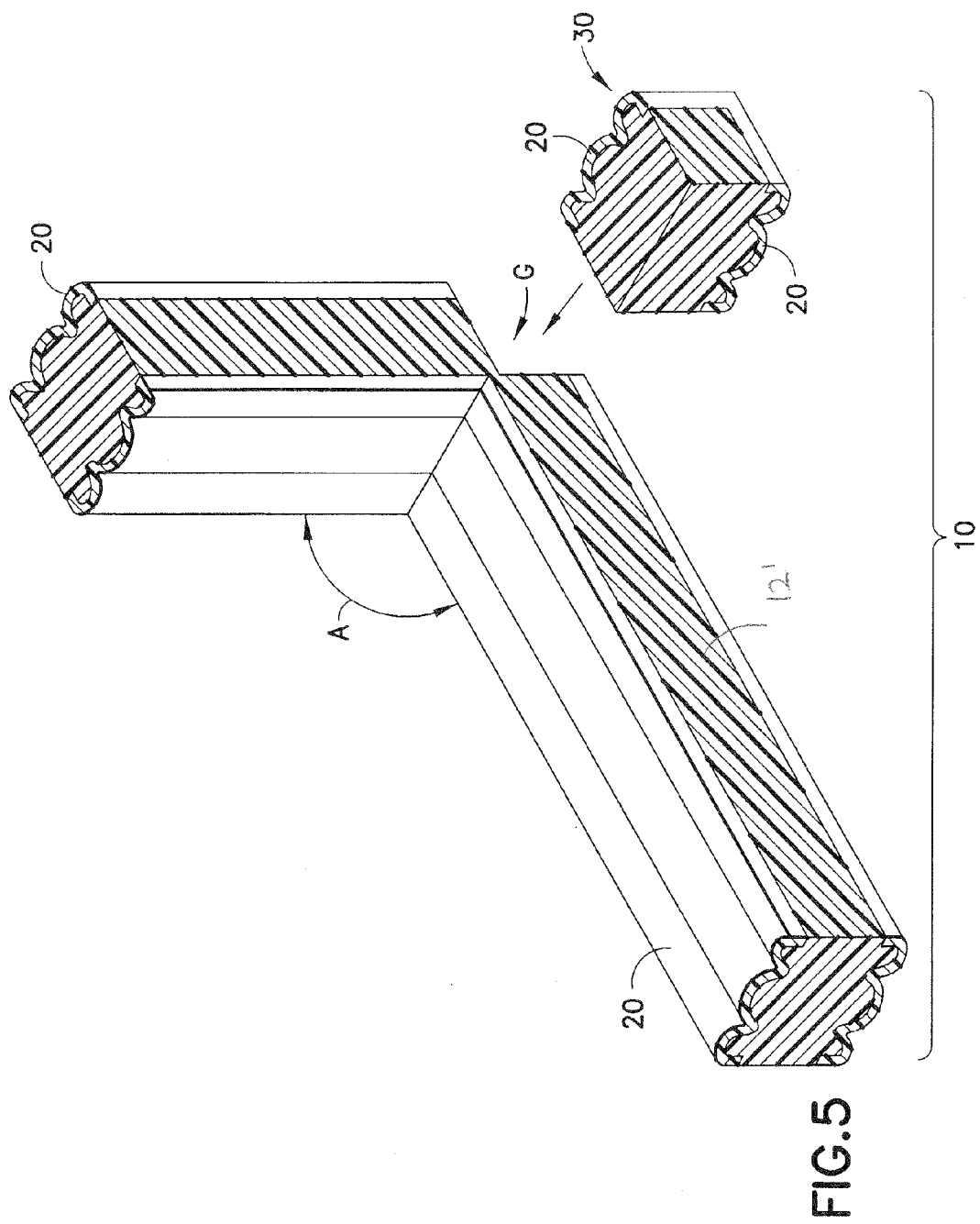
FIG. 5 is a perspective view of the assembly of laminations being further prepared to produce the vertical expansion joint system of FIG. 1.

Referring now to FIGS. 4 and 5, when the elastomer 20 has cured in place, the infused foam lamination 14 and/or core 12' is cut in a location at which a bend in the vertical expansion system 10 is desired to accommodate a corner. The cut, which is designated by the reference number 24 and as shown in FIG. 4, is made from the outside of the desired location of the bend to the inside of the desired location of the bend using a saw or any other suitable device. The cut 24 is stopped such that a distance d is defined from the termination of the cut to the previously applied coating of the elastomer 20 on the inside of the desired location of the bend (e.g., approximately one half inch from the previously applied coating of elastomer 20 on the inside of the bend). Referring now to FIG. 5, the lamination 14 is then bent to an appropriate angle A, thereby forming a gap G at the outside of the bend. Although a gap of 90 degrees is shown in FIG. 5, the present invention is not limited in this regard as other angles are possible.

Still referring to FIG. 5, a piece of core 12' and/or infused foam lamination constructed in a manner similar to that described above is inserted into the gap G as an insert piece 30 and held in place by the application of a similar coating of elastomer 20 as described above. In the alternative, the insert piece 30 may be held in place using a suitable adhesive. Accordingly, the angle A around the corner is made continuous via the insertion of the insert piece 30 located between a section of the open celled foam extending in the horizontal plane and a section of the open celled foam extending in the vertical plane. Once the gap has been filled and the insert piece 30 is securely in position, the entire vertical expansion system 10 including the insert piece 30 is inserted into a similar coating fixture with the previously applied elastomer 20 coated side facing down and the uncoated side facing upwards. The uncoated side is now coated with the same (or different) elastomer 20 as was used on the opposite face. Again, the elastomer 20 is then allowed to cure in position. Furthermore, the insert piece 30 inserted into the gap is not limited to being a lamination 14, as solid blocks or the like may be used.

After both sides have cured, the vertical expansion system 10 as the final uninstalled product is removed from the coating fixture and packaged for shipment. In the packaging operation the vertical expansion system 10 is compressed using a hydraulic or mechanical press (or the like) to a size below the nominal size of the expansion joint at the job site. The vertical expansion system 10 is held at this size using a heat shrinkable poly film. The present invention is not limited in this regard, however, as other devices (ties or the like) may be used to hold the vertical expansion system 10 to the desired size.

Figure 6:
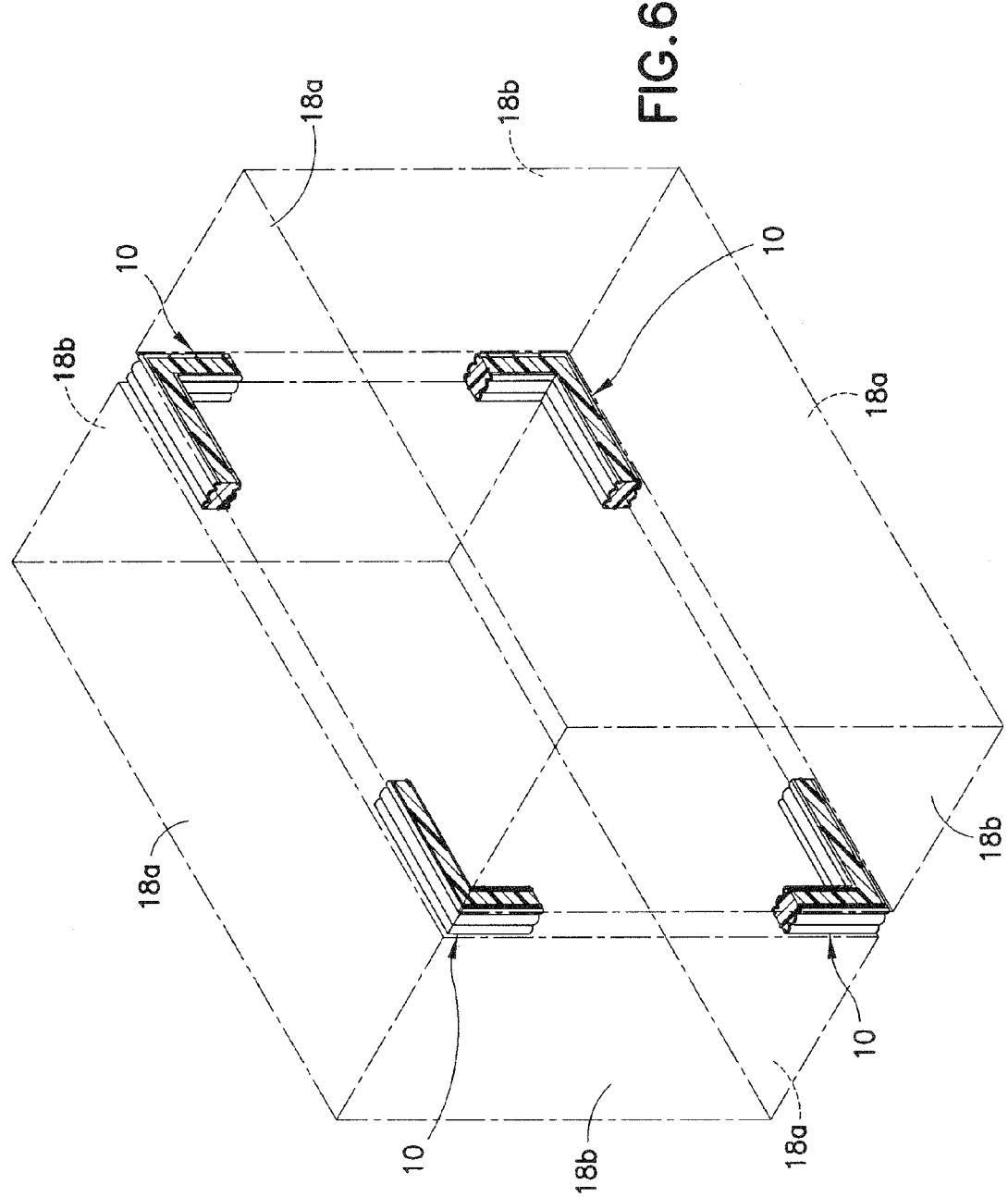
FIG. 6 is a perspective view of four sections of the vertical expansion joint system used in a building structure.

Referring now to FIG. 6, portions of the vertical expansion system 10 positioned to articulate right angle bends are shown as they would be positioned in a concrete expansion joint located in a tunnel, archway, or similar structure. Each portion defines a foam laminate that is positioned in a corner of the joint. As is shown, the vertical expansion joint system 10 is installed between horizontal coplanar substrates 18*a* and vertical coplanar substrates 18*b*.

Figure 7:
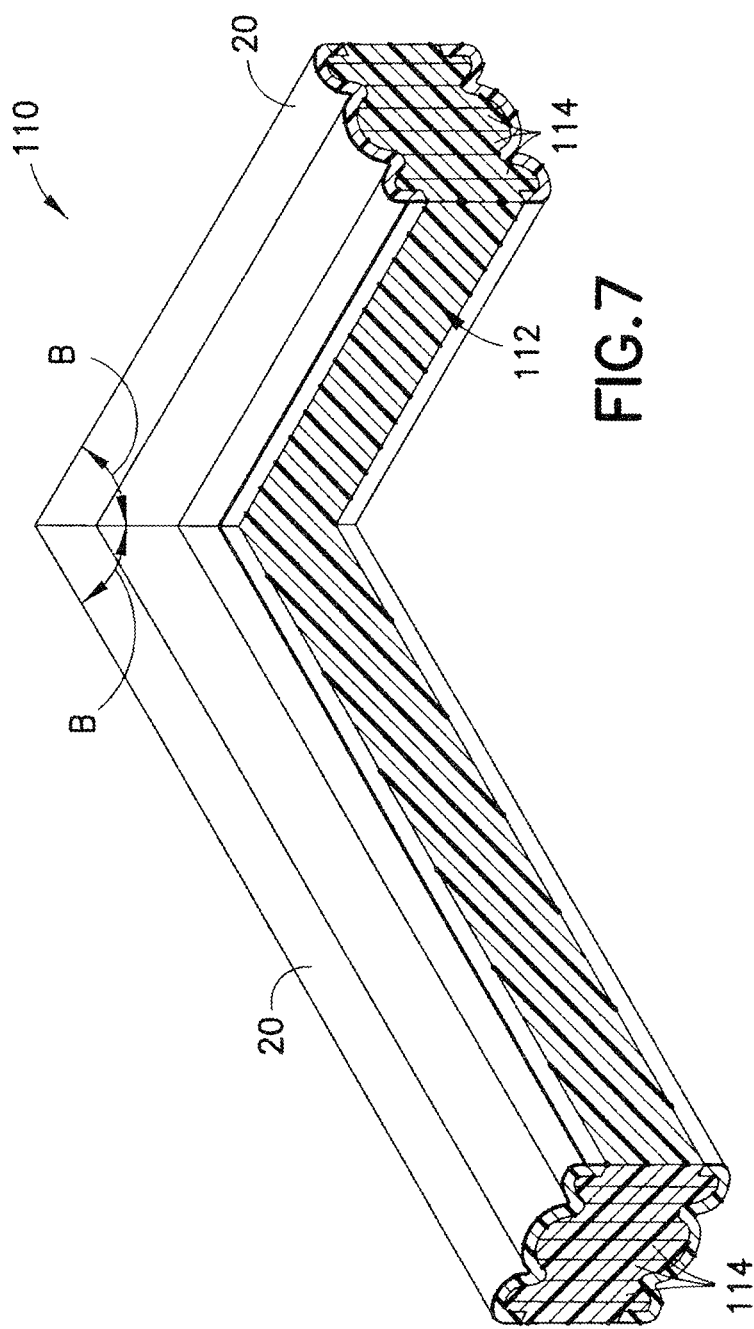
FIG. 7 is a perspective view of a horizontal expansion joint system of the present invention.

Referring now to FIG. 7, an alternate embodiment of the invention is shown. In this embodiment, the infused core 12' and/or foam, the elastomer coating on the top surface, and the elastomer coating on the bottom surface are similar to the above described embodiments. However, in FIG. 7, the expansion joint system designated generally by the reference number 110 is oriented in the horizontal plane rather than vertical plane and is hereinafter referred to as "horizontal expansion system 110." As with the vertical expansion system 10 described above, the horizontal expansion system 110 may be configured to transition right angles. The horizontal expansion system 110 is not limited to being configured to transition right angles, however, as it can be configured to accommodate any desired angle.

In the horizontal expansion system 110, the infused core 12' and/or foam lamination 14 is constructed in a similar fashion to that of the vertical expansion system 10, namely, by constructing a core 12' and/or foam 112 assembled from individual laminations 114 of suitable material, such as a foam material, one or more of which is infused with, e.g., an acrylic chemistry and/or a fire retardant material 60. Although the horizontal expansion system 110 is described as being fabricated from individual laminations 114, the present invention is not so limited, and other manners of constructing the core 12' and/or foam 112 are possible (e.g., solid blocks of material, e.g., foam material, as described above).

In fabricating the horizontal expansion system 110, two pieces of the core 12' and/or foam 112 are mitered at appropriate angles B (45 degrees is shown in FIG. 7, although other angles are possible). An elastomer, or other suitable adhesive, is applied to the mitered faces of the infused foam laminations. The individual laminations are then pushed together and held in place in a coating fixture at a width slightly greater than the largest joint movement anticipated. At this width the top is coated with an elastomer 20 and cured, according to embodiments. Following this, the core 12' and/or foam 112 is inverted and then the opposite side is likewise coated.

After both coatings of elastomer 20 have cured, the horizontal expansion system 110 is removed from the coating fixture and packaged for shipment. In the packaging operation, the horizontal expansion system 110 is compressed using a hydraulic or mechanical press (or the like) to a size below the nominal size of the expansion joint at the job site. The product is held at this size using a heat shrinkable poly film (or any other suitable device).

In a horizontal expansion system, e.g., system 110, the installation thereof can be accomplished by adhering the core 12' and/or foam 112 to a substrate (e.g., concrete, glass, wood, stone, metal, or the like) using an adhesive such as epoxy. The epoxy or other adhesive is applied to the faces of the horizontal expansion system 110 prior to removing the horizontal expansion system from the packaging restraints thereof. Once the packaging has been removed, the horizontal expansion system 110 will begin to expand, and the horizontal expansion system is inserted into the joint in the desired orientation. Once the horizontal expansion system 110 has expanded to suit the expansion joint, it will become locked in by the combination of the core 12' and/or foam back pressure and the adhesive.

In any system of the present invention, but particularly with regard to the vertical expansion system 10, an adhesive may be pre-applied to the core 12' and/or foam lamination. In this case, for installation, the core 12' and/or foam lamination is removed from the packaging and simply inserted into the expansion joint where it is allowed to expand to meet the concrete (or other) substrate. Once this is done, the adhesive in combination with the back pressure of the core 12' and/or foam will hold the foam in position.

The vertical expansion system 10 is generally used where there are vertical plane transitions in the expansion joint. For example, vertical plane transitions can occur where an expansion joint traverses a parking deck and then meets a sidewalk followed by a parapet wall. The expansion joint cuts through both the sidewalk and the parapet wall. In situations of this type, the vertical expansion system 10 also transitions from the parking deck (horizontally) to the curb (vertical), to the sidewalk (horizontal), and then from the sidewalk to the parapet (vertical) and in most cases across the parapet wall (horizontal) and down the other side of the parapet wall (vertical). Prior to the present invention, this would result in an installer having to fabricate most or all of these transitions on site using straight pieces. This process was difficult, time consuming, and error prone, and often resulted in waste and sometimes in sub-standard transitions.

In one example of installing the vertical expansion system 10 in a structure having a sidewalk and a parapet, the installer uses several individual sections, each section being configured to transition an angle. The installer uses the straight run of expansion joint product, stopping within about 12 inches of the transition, then installs one section of the vertical expansion system 10 with legs measuring about 12 inches by about 6 inches. If desired, the installer trims the legs of the vertical expansion system 10 to accommodate the straight run and the height of the sidewalk. Standard product is then installed across the sidewalk, stopping short of the transition to the parapet wall. Here another section of the vertical expansion system 10 is installed, which will take the product up the wall. Two further sections of the vertical expansion system 10 are used at the top inside and top outside corners of the parapet wall. The sections of the vertical expansion system 10 are adhered to each other and to the straight run expansion joint product in a similar fashion as the straight run product is adhered to itself. In this manner, the vertical expansion system 10 can be easily installed if the installer has been trained to install the standard straight run product. It should be noted, however, that the present invention is not limited to the installation of product in any particular sequence as the pieces can be installed in any suitable and/or desired order.

In one example of installing the horizontal expansion system 110, the system is installed where there are horizontal plane transitions in the expansion joint. This can happen when the expansion joint encounters obstructions such as supporting columns or walls. The horizontal expansion system 110 is configured to accommodate such obstructions. Prior to the present invention, the installer would have had to create field transitions to follow the expansion joint.

To extend a horizontal expansion system, e.g., system 110, around a typical support column, the installer uses four sections of the horizontal expansion system. A straight run of expansion joint product is installed and stopped approximately 12 inches short of the horizontal transition. The first section of the horizontal expansion system 110 is then installed to change directions, trimming as desired for the specific situation. Three additional sections of horizontal expansion system 110 are then joined, inserting straight run pieces as desired, such that the horizontal expansion system 110 extends around the column continues the straight run expansion joint on the opposite side. As with the vertical expansion system 10, the sections may be installed in any sequence that is desired.

The present invention is not limited to products configured at right angles, as any desired angle can be used for either a horizontal or vertical configuration. Also, the present invention is not limited to foam or laminates, as solid blocks of foam or other desired material and the like may alternatively or additionally be used.

Figure 8:
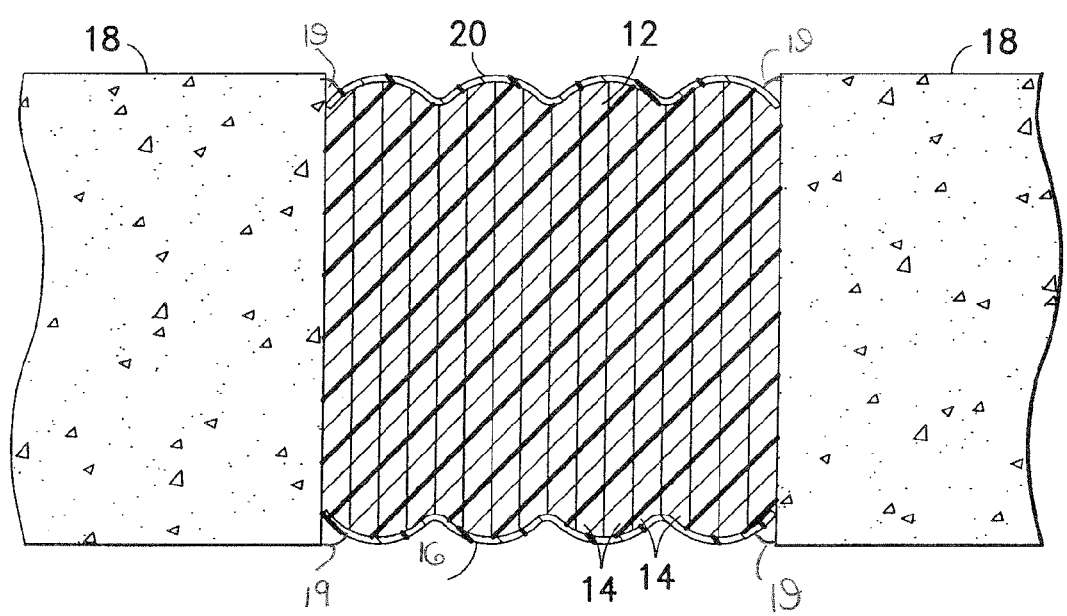
FIG. 8 is an end view of a vertical and/or horizontal expansion joint system installed between two substrates, depicting an elastomer on one surface of the core and an intumescent material on another surface of the core.

Moreover, while a core 12' coated with an elastomer 20 on one or both of its outer surfaces has been primarily described above, according to embodiments, the present invention is not limited in this regard. Thus, the vertical and horizontal expansion joint systems described herein are not limited in this regard. For example, as shown in FIG. 8, the surface of the infused foam laminate and/or core 12' opposite the surface coated with elastomer 20 is coated with an intumescent material 16, according to further embodiments. One type of intumescent material 16 may be a caulk having fire barrier properties. A caulk is generally a silicone, polyurethane, polysulfide, sylil-terminated-polyether, or polyurethane and acrylic sealing agent in latex or elastomeric base. Fire barrier properties are generally imparted to a caulk via the incorporation of one or more fire retardant agents. One preferred intumescent material 16 is 3M CP25WB+, which is a fire barrier caulk available from 3M of St. Paul, Minn. Like the elastomer 20, the intumescent material 16 is tooled or otherwise configured to create a "bellows" or other suitable profile to facilitate the compression of the foam lamination and/or core 12'. After tooling or otherwise configuring to have, e.g., the bellows-type of profile, both the coating of the elastomer 20 and the intumescent material 16 are cured in place on the foam 12 and/or core 12' while the infused foam lamination and/or core 12' is held at the prescribed compressed width. After the elastomer 20 and the intumescent material 16 have been cured, the entire composite is removed from the fixture, optionally compressed to less than the nominal size of the material and packaged for shipment to the job site. This embodiment is particularly suited to horizontal parking deck applications where waterproofing is desired on the top side and fire resistance is desired from beneath, as in the event of a vehicle fire on the parking deck below.

A sealant band and/or corner bead 19 of the elastomer 20 can be applied on the side(s) of the interface between the foam laminate (and/or core 12') and the substrate 18 to create a water tight seal.

Figure 9:
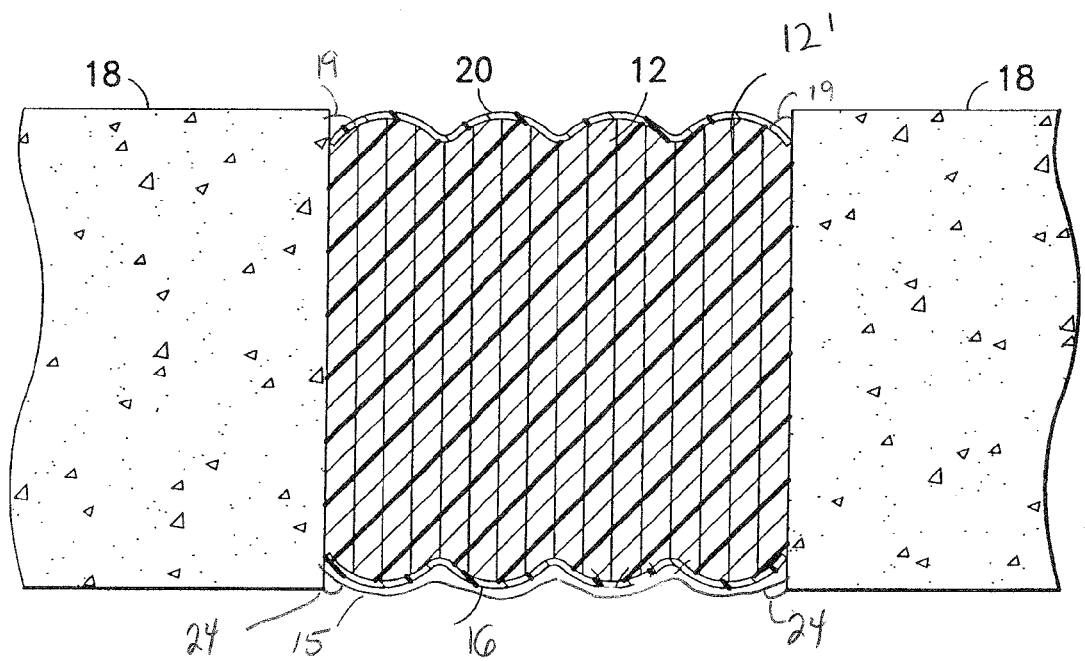
FIG. 9 is an end view of a vertical and/or horizontal expansion joint system installed between two substrates, depicting alternative layering on the core.

Referring now to FIG. 9, an alternate expansion joint system of the present invention illustrates the core 12' having a first elastomer 14 coated on one surface and the intumescent material 16 coated on an opposing surface. A second elastomer 15 is coated on the intumescent material 16 and serves the function of waterproofing. In this manner, the system is water resistant in both directions and fire resistant in one direction. The system of FIG. 9 is used in applications that are similar to the applications in which the other afore-referenced systems are used, but may also be used where water is present on the underside of the expansion joint. Additionally, it would be suitable for vertical expansion joints where waterproofing or water resistance is desirable in both directions while fire resistance is desired in only one direction. The second elastomer 15 may also serve to aesthetically integrate the system with surrounding substrate material.

Sealant bands and/or corner beads 19 of the first elastomer 20 can be applied to the sides as with the embodiments described above. Sealant bands and/or corner beads 24 can be applied on top of the second elastomer 15, thereby creating a water tight seal between the substrate and the intumescent material 16.

Figure 10:
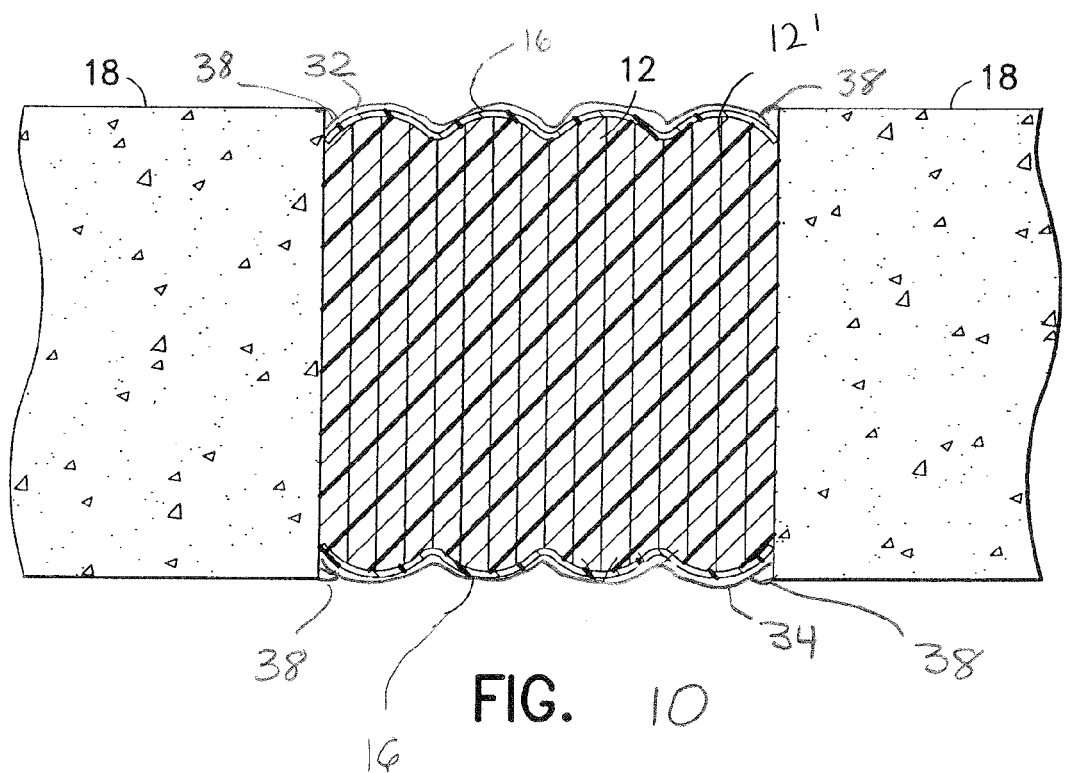
FIG. 10 is an end view of a vertical and/or horizontal expansion joint system installed between two substrates, depicting further layering on the core.

Referring now to FIG. 10, in this embodiment, the foam 12 and/or core 12' is similar to or the same as the above-described foam and/or core 12', but both exposed surfaces are coated first with the intumescent material 16 to define a first coating of the intumescent material and a second coating of the intumescent material 16. The first coating of the intumescent material 16 is coated with a first elastomer material 32, and the second coating of the intumescent material 16 is coated with a second elastomer material 34. This system can be used in the same environments as the above-described systems with the added benefit that it is both waterproof or at least water resistant and fire resistant in both directions through the joint. This makes it especially suitable for vertical joints in either interior or exterior applications.

Sealant bands and/or corner beads 38 of the elastomer can be applied in a similar fashion as described above and on both sides of the foam 12 and/or core 12'. This creates a water tight elastomer layer on both sides of the foam 12 and/or core 12'.

Figure 11:
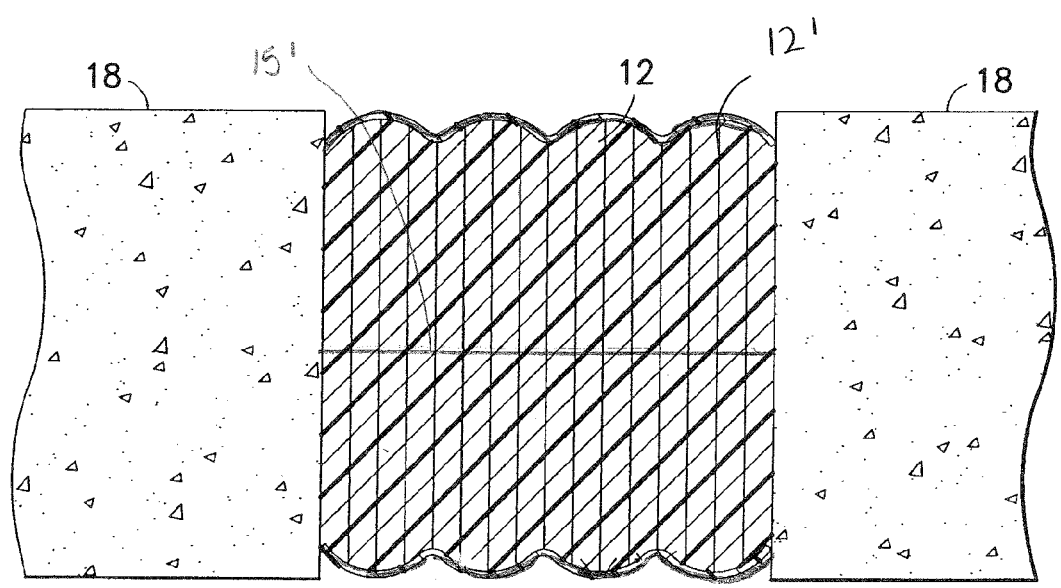
FIG. 11 is an end view of a vertical and/or horizontal expansion joint system installed between two substrates, depicting a fire retardant layer in the core and no coatings located on two outer surfaces of the core.

Referring now to FIG. 11, shown therein is another system, according to embodiments. In FIG. 11, the core 12' is infused with a fire retardant material, as described above. As an example, the fire retardant material can form a "sandwich type" construction wherein the fire retardant material forms a layer 15', as shown in FIG. 11, between the material of core 12'. Thus, the layer 15' comprising a fire retardant can be located within the body of the core 12' as, e.g., an inner layer, or lamination infused with a higher ratio or density of fire retardant than the core 12'. It is noted that the term "infused with" as used throughout the descriptions herein is meant to be broadly interpreted to refer to "includes" or "including." Thus, for example, "a core infused with a fire retardant" covers a "core including a fire retardant" in any form and amount, such as a layer, and so forth. Accordingly, as used herein, the term "infused with" would also include, but not be limited to, more particular embodiments such as "permeated" or "filled with" and so forth.

Moreover, it is noted that layer 15' is not limited to the exact location within the core 12' shown in FIG. 11 as the layer 15' may be included at various depths in the core 12' as desired. Moreover, it is further noted that the layer 15' may extend in any direction. For example, layer 15' may be oriented parallel to the direction in which the joint extends, perpendicular to the direction in which the joint extends or combinations of the foregoing. Layer 15' can function as a fire resistant barrier layer within the body of the core 12'. Accordingly, layer 15' can comprise any suitable material providing, e.g., fire barrier properties. No coatings are shown on the outer surfaces of core 12' of FIG. 11.

Accordingly, by tailoring the density as described above to achieve the desired water resistance and/or water proofing properties of the structure, combined with the infused fire retardant in layer 15', or infused within the core 12' in any other desired form including a non-layered form, additional layers, e.g. an additional water and/or fire resistant layer on either or both outer surfaces of the core 12', are not be necessary to achieve a dual functioning water and fire resistant system, according to embodiments.

It is noted, however, that additional layers could be employed if desired in the embodiment of FIG. 11, as well as in the other embodiments disclosed herein, and in any suitable combination and order. For example, the layering described above with respect to FIGS. 1-10 could be employed in the embodiment of FIG. 11 and/or FIG. 12 described below.

Figure 12:
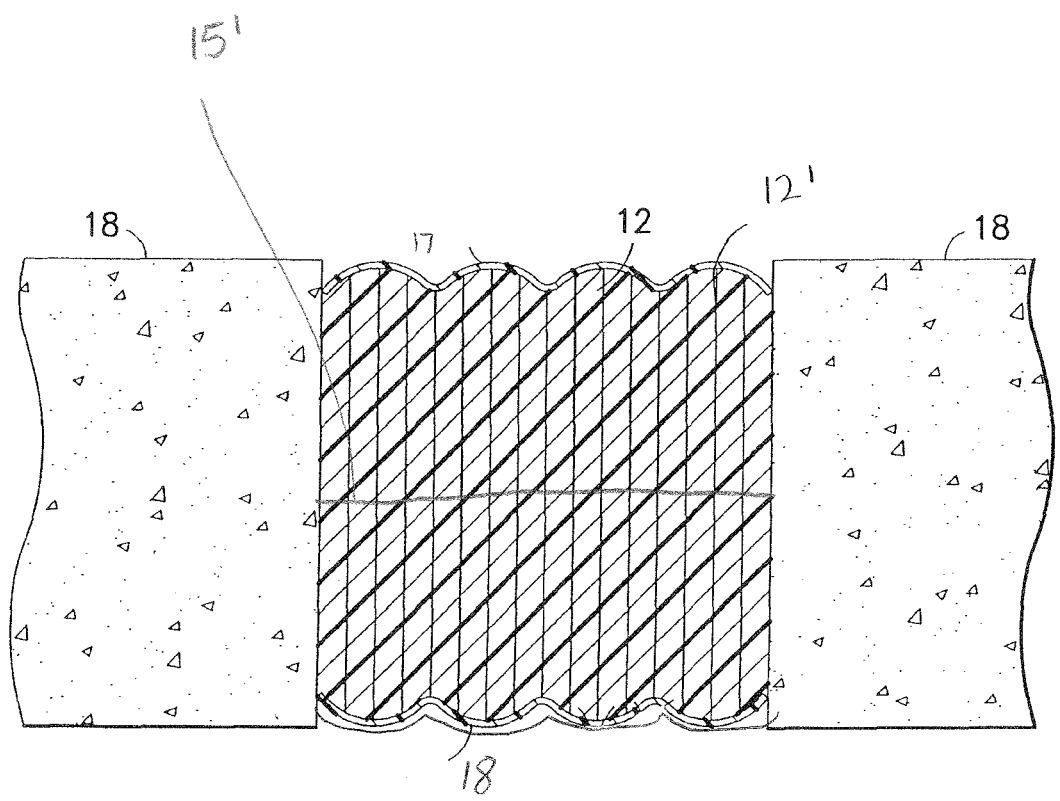
FIG. 12 is an end view of a vertical and/or horizontal expansion joint system installed between two substrates, depicting a fire retardant material in the core and layering on two outer surfaces of the core.

As a further example, FIG. 12 illustrates therein an expansion joint system comprising the layer 15' comprising a fire retardant within the body of the core 12' as described above with respect to FIG. 11, and also comprising an additional coating 17 on a surface of the core 12'. Coating 17 can comprise any suitable coating, such as the elastomer 20 described above, a fire barrier material including an intumescent material 16 described above or other suitable fire barrier material, e.g., a sealant, a fabric, a blanket, a foil, a tape, e.g., an intumescent tape, a mesh, a glass, e.g., fiberglass; and combinations thereof.

Moreover, embodiments include various combinations of layering and fire retardant infusion (in layer and non-layer form) to achieve, e.g., the dual functioning water and fire resistant expansion joint systems described herein, according to embodiments. For example, FIG. 12 illustrates coating 17 on one surface of the core 12' and a dual coating 18 on the opposite surface of the core 12'. The dual coating 18 can comprise, e.g., an inner layer of elastomer 20, as described above, with an outer layer of a fire barrier material including, e.g., an intumescent material. Similarly, the layers of the dual coating 18 can be reversed to comprise an inner layer of fire barrier material and an outer layer of elastomer 20.

Alternatively, only one layer may be present on either surface of core 12', such as one layer of a fire barrier material, e.g., sealant, on a surface of the core 12', which is infused with a fire retardant material in layer 15' or infused in a non-layer form. Still further, other combinations of suitable layering include, e.g., dual coating 18 on both surfaces of the core 12' and in any combination of inner and outer layers, as described above.

It is additionally noted that the embodiments shown in, e.g., FIGS. 8-12 can be similarly constructed and installed, as described above with respect to, e.g., the embodiments of FIGS. 1-7, modified as appropriate for inclusion/deletion of various layering, and so forth. Thus, for example, as described above, while a "bellows" construction is illustrated by the figures, the embodiments described herein are not limited to such a profile as other suitable profiles may be employed, such as straight, curved, and so forth.

Accordingly, as further evident from the foregoing, embodiments of the dual functioning fire and water resistant expansion joint systems can comprise various ordering and layering of materials on the outer surfaces of the core 12'. Similarly, a fire retardant material can be infused into the core 12' in various forms, to create, e.g., a layered "sandwich type" construction with use of, e.g., layer 15'.

In the embodiments described herein, the infused foam laminate and/or core 12' may be constructed in a manner which insures that substantially the same density of fire retardant 60 is present in the product regardless of the final size of the product, according to embodiments. The starting density of the infused foam/core is approximately 140 kg/m$^3$, according to embodiments. Other suitable densities include between about 80 kg/m$^3$ and about 180 kg/m$^3$. After compression, the infused foam/core density is in the range of about 160-800 kg/m$^3$, according to embodiments. After installation the laminate and/or core 12' will typically cycle between densities of approximately 750 kg/m$^3$ at the smallest size of the expansion joint to approximately 360-450 kg/m$^3$, e.g., approximately 400-450 kg/m$^3$ (or less) at the maximum size of the joint. A density of 400-450 kg/m$^3$ was determined through experimentation, as a reasonable value which still affords adequate fire retardant capacity, such that the resultant composite can pass the UL 2079 test program. The present invention is not limited to cycling in the foregoing ranges, however, and the foam/core may attain densities outside of the herein-described ranges.

It is further noted that various embodiments, including constructions, layering and so forth described herein can be combined in any order to result in, e.g., a dual functioning water and fire resistant expansion joint system. Thus, embodiments described herein are not limited to the specific construction of the figures, as the various materials, layering and so forth described herein can be combined in any desired combination and order.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A fire and water resistant expansion joint system, comprising:
   a core;
   a fire retardant infused into the core; and
   a water resistant layer disposed on the core;
   wherein the layer is tooled to define a profile to facilitate compression of the expansion joint system when installed between substrates, wherein the core infused with the fire retardant compressed has as a density of about 160 kg/m$^3$ to about 800 kg/m$^3$; and
   wherein the expansion joint system is angled around a corner, and the fire and water resistant expansion joint system and the core infused with the fire retardant are configured to pass testing mandated by UL 2079.

2. The expansion joint system of claim 1, wherein the core comprises a plurality of individual laminations assembled to construct a laminate, one or more of the laminations being infused with at least one of the fire retardant and a water-based acrylic chemistry.

3. The expansion joint system of claim 1, wherein vertically oriented surfaces of the core are retained between edges of the coplanar substrates.

4. The expansion joint system of claim 1, wherein the core comprises foam.

5. The expansion joint system of claim 4, wherein the water resistant layer disposed on the foam is selected from the group consisting of polysulfides, acrylics, polyurethanes, poly-epoxides, silyl-terminated polyethers, and combinations of one or more of the foregoing.

6. The expansion joint system of claim 4, wherein the core comprises a block of foam.

7. The expansion joint system of claim 1, wherein the water resistant layer disposed on the core comprises a silicone.

8. The expansion joint system of claim 1, wherein the water resistant layer is tooled to define at least one of a bellows profile and a bullet profile.

9. The expansion joint system of claim 1, wherein the expansion joint system is angled around the corner to extend from a horizontal plane to a vertical plane.

10. The expansion joint system of claim 9, wherein the angle around the corner is made continuous via the insertion of an insert piece located between a section of the core extending in the horizontal plane and a section of the core extending in the vertical plane.

11. The expansion joint system of claim 1, wherein the expansion joint system is angled around the corner and extends in a horizontal plane.

12. The expansion joint system of claim 11, wherein the angle around the corner comprises a miter joint between two sections of the core extending in the horizontal plane.

13. The expansion joint system of claim 12, wherein the two sections of core extending in the horizontal plane are adhesively joined.

14. The expansion joint system of claim 1, wherein the ratio of the fire retardant infused into the core is in a range of about 3.5:1 to about 4:1 by weight.

15. The expansion joint system of claim 1, wherein a layer comprising the fire retardant is sandwiched between the material of the core.

16. The expansion joint system of claim 1, wherein the fire retardant infused into the core is selected from the group consisting of water-based alumina tri-hydrate, metal oxides, metal hydroxides, aluminum oxides, antimony oxides and hydroxides, iron compounds, ferrocene, molybdenum trioxide, nitrogen-based compounds, phosphorus based compounds, halogen based compounds, halogens, and combinations of the foregoing materials.

17. The expansion joint system of claim 1, wherein the core uncompressed has a density of about 100 kg/m$^3$ to about 180 kg/m$^3$.

18. The expansion joint system of claim 1, further comprising a second layer disposed on the water resistant layer, wherein the second layer is selected from the group consisting of another water resistant layer, a fire barrier layer and combinations thereof.

19. The expansion joint system of claim 1, wherein a first coating is located on a surface of the core, and a second coating is located on a surface of the core opposing the first coating, wherein the first coating is the substantially the same as or different than the second coating.

20. The expansion joint system of claim 1, wherein the fire and water resistant expansion joint system is capable of withstanding exposure to a temperature of about 930° C. at about one hour.

21. The expansion joint system of claim 1, wherein the fire and water resistant expansion joint system is capable of withstanding exposure to a temperature of about 1010° C. at about two hours.

22. The expansion joint system of claim 1, wherein the fire and water resistant expansion joint system is capable of withstanding exposure to a temperature of about 1260° C. at about eight hours.

23. The expansion joint system of claim 22, wherein the ratio of the fire retardant material infused into the core is in a range of about 3.5:1 to about 4:1 by weight.

24. The expansion joint system of claim 1, wherein the expansion joint system is a tunnel expansion joint system.

25. The expansion joint system of claim 1, wherein the core infused with the fire retardant uncompressed has as a density of about 50 kg/m$^3$ to about 250 kg/m$^3$.

26. A fire and water resistant vertical expansion joint system, comprising:
a first section of core extending in a horizontal plane;
a second section of core extending in a vertical plane;
an insert piece of core located between the first section of core extending in the horizontal plane and the second section of core extending in the vertical plane, the insert piece being configured to transition the first section of the core from the horizontal plane to the vertical plane of the second section of the core; and
a water resistant layer disposed on the core, the water resistant layer imparting a substantially waterproof property to the core, wherein the water resistant layer is a continuous layer of the water resistant layer from the vertical plane to the horizontal plane and the water resistant layer is a continuous layer of the water resistant layer over the insert piece, and the insert piece is held in place by the continuous layer of the water resistant layer, and the expansion joint system is configured to accommodate at least one of thermal and seismic movement in the system;
wherein the core is infused with a fire retardant;
wherein the fire and water resistant vertical expansion joint system is installable between horizontal substrates and vertical substrates, wherein the core infused with the fire retardant compressed has as a density of about 160 kg/m$^3$ to about 800 kg/m$^3$; and
wherein the fire and water resistant vertical expansion joint system and the core infused with the fire retardant are configured to pass movement cycling and fire endurance testing mandated by UL 2079.

27. The vertical expansion joint system of claim 26, wherein the core comprises a plurality of individual laminations assembled to construct a laminate.

28. The vertical expansion joint system of claim 27, wherein the core comprises open celled polyurethane foam.

29. The vertical expansion joint system of claim 26, further comprising an acrylic infused in the core.

30. The vertical expansion joint system of claim 26, wherein the ratio of the fire retardant infused into the core is in a range of about 3.5:1 to about 4:1 by weight.

31. The vertical expansion joint system of claim 26, wherein a layer comprising the fire retardant is sandwiched between the material of the core.

32. The vertical expansion joint system of claim 26, wherein the fire and water resistant vertical expansion joint system is capable of withstanding exposure to a temperature of about 1010° C. at about two hours.

33. The vertical expansion joint system of claim 26, wherein the fire and water resistant vertical expansion joint system is capable of withstanding exposure to a temperature of about 1260° C. at about eight hours.

34. The vertical expansion joint system of claim 33, wherein the ratio of the fire retardant material infused into the core is in a range of about 3.5:1 to about 4:1 by weight.

35. The expansion joint system of claim 26, wherein the core infused with the fire retardant uncompressed has as a density of about 50 kg/m$^3$ to about 250 kg/m$^3$.

36. A fire and water resistant expansion joint system, comprising:
a core;
a fire retardant infused into the core;
wherein the core infused with the fire retardant is configured to define a profile to facilitate the compression of the expansion joint system when installed between substrates, wherein the core infused with the fire retardant compressed has as a density of about 160 kg/m$^3$ to about 800 kg/m$^3$; and
wherein the expansion joint system is angled around a corner, and the fire and water resistant expansion joint system and the core infused with the fire retardant are configured to pass testing mandated by UL 2079.

37. The expansion joint system of claim 36, wherein the core comprises a first outer surface and a second outer surface, and no coatings are located on either the first outer surface or the second outer surface.

38. The fire and water resistant expansion joint system of claim 36, wherein the fire and water resistant expansion joint system is capable of withstanding exposure to a temperature of about 1260° C. at about eight hours, and the ratio of the fire retardant material infused into the core is in a range of about 3.5:1 to about 4:1 by weight.

39. The expansion joint system of claim 36, wherein the expansion joint system is a tunnel expansion system.

40. The expansion joint system of claim 36, wherein the core infused with the fire retardant uncompressed has as a density of about 50 kg/m³ to about 250 kg/m³.

\* \* \* \* \*